United States Patent
Turney

(10) Patent No.: US 11,391,484 B2
(45) Date of Patent: *Jul. 19, 2022

(54) BUILDING CONTROL SYSTEM WITH CONSTRAINT GENERATION USING ARTIFICIAL INTELLIGENCE MODEL

(71) Applicant: Johnson Controls Technology Company, Auburn Hills, MI (US)

(72) Inventor: Robert D. Turney, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,006

(22) Filed: Nov. 6, 2020

(65) Prior Publication Data

US 2021/0055016 A1   Feb. 25, 2021

Related U.S. Application Data

(63) Continuation of application No. 15/953,319, filed on Apr. 13, 2018, now Pat. No. 10,845,083.

(Continued)

(51) Int. Cl.
*F24F 11/63* (2018.01)
*G05B 13/02* (2006.01)
(Continued)

(52) U.S. Cl.
CPC .............. *F24F 11/63* (2018.01); *F24F 11/47* (2018.01); *G05B 13/027* (2013.01);
(Continued)

(58) Field of Classification Search
CPC .. F24F 11/47; F24F 11/58; F24F 11/63; F24F 11/84; F24F 2110/10; F24F 2110/12;
(Continued)

(56) References Cited

U.S. PATENT DOCUMENTS 6,145,751 A   11/2000  Ahmed
7,580,775 B2   8/2009  Kulyk et al.
(Continued)

FOREIGN PATENT DOCUMENTS

CN       1855141 A   11/2006
CN     103917928 A    7/2014
(Continued)

OTHER PUBLICATIONS

Astrom. "Optimal Control of Markov Decision Processes with Incomplete State Estimation," J. Math. Anal. Appl., 1965, 10, pp. 174-205.
(Continued)

*Primary Examiner* — Chun Cao
(74) *Attorney, Agent, or Firm* — Foley & Lardner LLP

(57) ABSTRACT

A building control system includes one or more processors and one or more non-transitory computer-readable media storing instructions. When executed by the one or more processors, the instructions cause the one or more processors to perform operations including using an artificial intelligence model to adjust a threshold value of a constraint based on user input provided via one or more user devices during a first time period. The user input indicates user satisfaction with an environmental condition of a building space during the first time period. The operations include using the threshold value of the constraint to operate equipment that affect the environmental condition of the building space during a second time period subsequent to the first time period.

20 Claims, 6 Drawing Sheets

Related U.S. Application Data

(60) Provisional application No. 62/489,975, filed on Apr. 25, 2017.

(51) Int. Cl.
| | | |
|---|---|---|
| *G05B 13/04* | (2006.01) | |
| *G05B 15/02* | (2006.01) | |
| *F24F 11/47* | (2018.01) | |
| *F24F 11/84* | (2018.01) | |
| *F24F 110/10* | (2018.01) | |
| *F24F 11/58* | (2018.01) | |
| *F24F 110/12* | (2018.01) | |

(52) U.S. Cl.
CPC ............ *G05B 13/048* (2013.01); *G05B 15/02* (2013.01); *F24F 11/58* (2018.01); *F24F 11/84* (2018.01); *F24F 2110/10* (2018.01); *F24F 2110/12* (2018.01); *G05B 2219/2642* (2013.01)

(58) Field of Classification Search
CPC .... G05B 13/027; G05B 13/048; G05B 15/02; G05B 2219/2642
USPC ....................................................... 700/276
See application file for complete search history.

(56) References Cited

U.S. PATENT DOCUMENTS

| | | | |
|---|---|---|---|
| 7,894,946 | B2 | 2/2011 | Kulyk et al. |
| 8,370,283 | B2 | 2/2013 | Pitcher et al. |
| 8,457,802 | B1 | 6/2013 | Steven et al. |
| 8,527,108 | B2 | 9/2013 | Kulyk et al. |
| 8,527,109 | B2 | 9/2013 | Kulyk et al. |
| 8,762,942 | B2 | 6/2014 | Langworthy et al. |
| 8,903,554 | B2 | 12/2014 | Stagner |
| 8,918,223 | B2 | 12/2014 | Kulyk et al. |
| 9,110,647 | B2 | 8/2015 | Kulyk et al. |
| 9,429,923 | B2 | 8/2016 | Ward et al. |
| 9,436,179 | B1 | 9/2016 | Turney et al. |
| 9,703,339 | B2 | 7/2017 | Kulyk et al. |
| 9,977,447 | B2 | 5/2018 | Al-Mohssen et al. |
| 10,108,215 | B2 | 10/2018 | Al-Mohssen et al. |
| 10,139,877 | B2 | 11/2018 | Kulyk et al. |
| 10,175,681 | B2 | 1/2019 | Wenzel et al. |
| 10,282,796 | B2 | 5/2019 | Elbsat et al. |
| 10,324,483 | B2 | 6/2019 | Elbsat |
| 10,359,748 | B2 | 7/2019 | Elbsat et al. |
| 10,364,996 | B2 * | 7/2019 | Zhao .................. F24F 11/30 |
| 10,389,136 | B2 | 8/2019 | Drees |
| 10,554,170 | B2 | 2/2020 | Drees |
| 10,564,610 | B2 | 2/2020 | Drees |
| 10,761,547 | B2 | 9/2020 | Risbeck et al. |
| 10,845,083 | B2 * | 11/2020 | Turney .................. G05B 15/02 |
| 10,876,755 | B2 | 12/2020 | Martin |
| 2006/0236248 | A1 | 10/2006 | Eischeid et al. |
| 2007/0143045 | A1 | 6/2007 | Macgregor |
| 2007/0208682 | A1 | 9/2007 | Mancisidor et al. |
| 2008/0167756 | A1 | 7/2008 | Golden et al. |
| 2010/0179704 | A1 | 7/2010 | Ozog |
| 2010/0262298 | A1 | 10/2010 | Johnson et al. |
| 2011/0066258 | A1 | 3/2011 | Torzhkov et al. |
| 2011/0071952 | A1 | 3/2011 | Gaffney et al. |
| 2011/0087381 | A1 | 4/2011 | Hirato et al. |
| 2011/0087988 | A1 | 4/2011 | Ray et al. |
| 2011/0208365 | A1 | 8/2011 | Miller |
| 2012/0083927 | A1 | 4/2012 | Nakamura et al. |
| 2012/0215362 | A1 | 8/2012 | Stagner |
| 2012/0232701 | A1 | 9/2012 | Carty et al. |
| 2012/0259469 | A1 | 10/2012 | Ward et al. |
| 2012/0296480 | A1 | 11/2012 | Raman et al. |
| 2012/0310418 | A1 | 12/2012 | Harrod et al. |
| 2012/0310560 | A1 | 12/2012 | Ozaki |
| 2013/0085614 | A1 | 4/2013 | Wenzel et al. |
| 2013/0345889 | A1 | 12/2013 | Osogami et al. |
| 2014/0163759 | A1 | 6/2014 | Anderson et al. |
| 2014/0249876 | A1 | 9/2014 | Wu et al. |
| 2014/0358291 | A1 * | 12/2014 | Wells ...................... G05B 15/02 |
| | | | 700/276 |
| 2015/0057820 | A1 | 2/2015 | Kefayati et al. |
| 2015/0081107 | A1 * | 3/2015 | Graham ............. G05D 23/1917 |
| | | | 700/276 |
| 2015/0256549 | A1 | 9/2015 | Spurlock et al. |
| 2015/0309495 | A1 | 10/2015 | Delorme et al. |
| 2015/0316901 | A1 | 11/2015 | Wenzel et al. |
| 2015/0316902 | A1 | 11/2015 | Wenzel et al. |
| 2015/0316903 | A1 | 11/2015 | Asmus et al. |
| 2015/0316907 | A1 | 11/2015 | Elbsat et al. |
| 2015/0316946 | A1 | 11/2015 | Wenzel et al. |
| 2015/0331689 | A1 | 11/2015 | Blahaerath et al. |
| 2016/0020608 | A1 | 1/2016 | Carrasco et al. |
| 2016/0102881 | A1 | 4/2016 | Kim et al. |
| 2016/0305678 | A1 | 10/2016 | Pavlovski et al. |
| 2016/0313751 | A1 | 10/2016 | Risbeck et al. |
| 2016/0350080 | A1 | 12/2016 | Ravindran et al. |
| 2016/0377306 | A1 | 12/2016 | Drees et al. |
| 2017/0006135 | A1 | 1/2017 | Siebel |
| 2017/0031962 | A1 | 2/2017 | Turney et al. |
| 2017/0102162 | A1 | 4/2017 | Drees et al. |
| 2017/0102433 | A1 | 4/2017 | Wenzel et al. |
| 2017/0102434 | A1 | 4/2017 | Wenzel et al. |
| 2017/0102675 | A1 | 4/2017 | Drees |
| 2017/0103483 | A1 | 4/2017 | Drees et al. |
| 2017/0104332 | A1 | 4/2017 | Wenzel et al. |
| 2017/0104336 | A1 | 4/2017 | Elbsat et al. |
| 2017/0104337 | A1 | 4/2017 | Drees |
| 2017/0104342 | A1 | 4/2017 | Elbsat et al. |
| 2017/0104343 | A1 | 4/2017 | Elbsat et al. |
| 2017/0104344 | A1 | 4/2017 | Wenzel et al. |
| 2017/0104345 | A1 | 4/2017 | Wenzel et al. |
| 2017/0104346 | A1 | 4/2017 | Wenzel et al. |
| 2017/0104449 | A1 | 4/2017 | Drees |
| 2017/0212488 | A1 | 7/2017 | Kummer et al. |
| 2018/0004171 | A1 | 1/2018 | Patel et al. |
| 2018/0113482 | A1 | 4/2018 | Vitullo |
| 2018/0196456 | A1 | 7/2018 | Elbsat |
| 2018/0197253 | A1 | 7/2018 | Elbsat et al. |
| 2018/0224814 | A1 | 8/2018 | Elbsat et al. |
| 2018/0285800 | A1 | 10/2018 | Wenzel et al. |
| 2018/0356782 | A1 | 12/2018 | Elbsat et al. |
| 2020/0191427 | A1 | 6/2020 | Martin |
| 2020/0200423 | A1 | 6/2020 | Gervais |

FOREIGN PATENT DOCUMENTS

| | | |
|---|---|---|
| CN | 105929687 A | 9/2016 |
| CN | 106066077 A | 11/2016 |
| CN | 11895625 A | 11/2020 |
| EP | 2 344 959 B1 | 5/2017 |
| GB | 2 541 170 A | 2/2017 |
| JP | H05-126380 | 5/1993 |
| JP | 2015-095215 | 5/2015 |
| JP | 6144346 B2 | 6/2017 |
| WO | WO-2011/072332 A1 | 6/2011 |
| WO | WO-2017/007990 A1 | 1/2017 |
| WO | WO-2017/062896 A1 | 4/2017 |

OTHER PUBLICATIONS

Bittanti et al., Adaptive Control of Linear Time Invariant Systems: The "Bet on the Best" Principle, Communications in Information and Systems, 2006, 6.4, pp. 299-320.

Chen et al., "Control-oriented System Identification: an H1 Approach," Wiley-Interscience, 2000, 19, Chapters 3 & 8, 38 pages.

Feng et al., "Model Predictive Control of Radiant Slab Systems with Evaporative Cooling Sources," Energy and Buildings, 2015, 87, pp. 199-210.

Hardt et al., "Gradient Descent Learns Linear Dynamical Systems," Journal of Machine Learning Research, 2018, 19, pp. 1-44.

Helmicki et al. "Control Oriented System Identification: a Worst-case/deterministic Approach in H1," IEEE Transactions on Automatic Control, 1991, 36.10, pp. 1163-1176.

(56) References Cited

OTHER PUBLICATIONS

Kelman et al., "Bilinear Model Predictive Control of a HVAC System Using Sequential Quadratic Programming," Proceedings of the IFAC World Congress, Sep. 2, 2011, 6 pages.
Kingma et al,. "Adam: A Method for Stochastic Optimization," International Conference on Learning Representations (ICLR), 2015, 15 pages.
Ljung et al., "Theory and Practice of Recursive Identification," vol. 5. JSTOR, 1983, Chapters 2, 3 & 7, 80 pages.
Ljung, editor. "System Identification: Theory for the User," 2nd Edition, Prentice Hall, Upper Saddle River, New Jersey, 1999, Chapters 5 and 7, 40 pages.
Nevena et al., "Data center cooling using model-predictive control," 32nd Conference on Neural Information Processing Systems, 2018, 10 pages.
Yudong et al., "Predictive Control for Energy Efficient Buildings with Thermal Storage: Modeling, Stimulation, and Experiments." IEEE Control Systems, Feb. 2012, 32.1, pp. 44-64.
Freire et al., "Predictive controllers for thermal comfort optimization and energy savings," Energy and Buildings, 2008, vol. 40, No. 7, pp. 1353-1365.
Nwankpa et al., "Activation Functions: Comparison of Trends in Practice and Research for Deep Learning," Engineering, University of Strathclyde, Glasgow, UK, 2018, 20 pages.
Schiavon et al., "Dynamic predictive clothing insulation models based on outdoor air and indoor operative temperatures," 2013, Building and Environment, 59, pp. 250-260.
Shanker et al., "Effect of Data Standardization on Neural Network Training," Omega, Int. J. Mgmt. Sci., 1996, vol. 24, No. 4, pp. 385-397.
Srivastava et al., "Dropout: a simple way to prevent neural networks from overfitting," Journal of Machine Learning Research, 2014, vol. 15, No. 1, pp. 1929-1958.
Taleghani et al., "A review into thermal comfort in buildings," Renewable and Sustainable Energy Reviews, Oct. 2013, vol. 26, pp. 201-215.
Timplalexis et al., "Thermal Comfort Metabolic Rate and Clothing Inference," Centre for Research and Technology Hellas/Information Technologies Institute, Greece, Sep. 2019, pp. 690-699.
Wenzel et al., "Autonomous Optimization and Control for Central Plants with Energy Storage," International High Performance Buildings Conference, 2016, paper 214, 11 pages.
Wenzel et al., "Model Predictive Control for Central Plant Optimization with Thermal V Energy Storage," International High Performance Buildings Conference, 2014, paper 122, 11 pages.
Extended European Search Reported on EP 18176474, dated Sep. 5, 2018, 8 pages.
George et al., "Time Series Analysis: Forecasting and Control," Fifth Edition, John Wiley & Sons, 2016, Chapters 4-7 and 13-15, 183 pages.
International Search Report and Written Opinion on PCT/US2018/021185, dated Jun. 20, 2018, 14 pages.
International Search Report and Written Opinion on PCT/US2018/021288, dated Aug. 13, 2018, 20 pages.
International Search Report and Written Opinion on PCT/US2018/027657, dated Jul. 6, 2018, 13 pages.
International Search Report and Written Opinion on PCT/US2020/045237, dated Nov. 10, 2020, 18 pages.
Ma et al., "Model Predictive Control for the Operation of Building Cooling Systems," IEEE Transactions on Control Systems Technology, May 2012, 20:3, pp. 796-803.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Protocol Buffer Basics, URL: https://developers.google.com/protocol-buffers/docs/csharptutorial, updated May 12, 2017, last updated May 12, 2017, retrieved from the internet Feb. 7, 2018, 8 pages.
Office Action on JP 2019-556840, dated Jan. 5, 2021, 5 pages.
EP Office Action on EP Appl. Ser. No. 18713481.2, dated Oct. 5, 2021 (9 pages).
Office Action on JP Appl. Ser. No. 2019-556840 dated Sep. 7, 2021 (12 pages).
International Preliminary Report on patentability on PCT Appl. Ser. No. PCT/US2020/045237 dated Feb. 17, 2022 (11 pages).
CN Office Action with Search Report on CN Appl. Ser. No. 201880040535.8 dated Apr. 26, 2022, No Translation (10 pages).

\* cited by examiner

BUILDING CONTROL SYSTEM WITH CONSTRAINT GENERATION USING ARTIFICIAL INTELLIGENCE MODEL

CROSS-REFERENCE TO RELATED PATENT APPLICATIONS

This application is a continuation of U.S. patent application Ser. No. 15/953,319 filed Apr. 13, 2018, which claims the benefit of and priority to U.S. Provisional Patent Application No. 62/489,975 filed Apr. 25, 2017. The entire disclosures of both these patent applications are incorporated by reference herein.

BACKGROUND

The present disclosure relates generally to a predictive building control system that uses a predictive model to optimize the cost of energy consumed by HVAC equipment. The present disclosure relates more particularly to a building control system that uses a neural network model to automatically generate constraints on the optimization of the predictive model.

SUMMARY

One implementation of the present disclosure is a predictive building control system. The system includes equipment operable to provide heating or cooling to a building and a predictive controller. The predictive controller includes one or more optimization controllers configured to perform an optimization to generate setpoints for the equipment at each time step of an optimization period subject to one or more constraints, a constraint generator configured to use a neural network model to generate the one or more constraints, and an equipment controller configured to operate the equipment to achieve the setpoints generated by the one or more optimization controllers at each time step of the optimization period.

In some embodiments, the constraint generator comprises a neural network modeler configured to classify the constraints generated by the constraint generator as satisfactory or unsatisfactory and train the neural network model based on whether the constraints generated by the constraint generator are classified as satisfactory or unsatisfactory.

In some embodiments, the constraint generator includes a neural network modeler configured to generate a performance score for the constraints generated by the constraint generator and train the neural network model using the performance score.

In some embodiments, the equipment include building equipment that operate to affect a zone temperature of a building zone within the building. The setpoints may include zone temperature setpoints for the building zone at each time step of the optimization period. The constraints may include one or more temperature bounds on the zone temperature setpoints.

In some embodiments, the constraint generator includes a neural network modeler configured to detect a manual adjustment to the setpoints generated by the one or more optimization controllers, use a magnitude of the manual adjustment generate a performance score for the constraints generated by the constraint generator, and train the neural network model using the performance score.

In some embodiments, the equipment include central plant equipment that operate to affect a water temperature of a chilled water output or hot water output provided to the building. The setpoints may include water temperature setpoints for the chilled water output or the hot water output at each time step of the optimization period. The constraints may include one or more temperature bounds on the water temperature setpoints.

In some embodiments, the constraint generator includes a neural network modeler configured to detect a valve position of a flow control valve that regulates a flow of the chilled water output or the hot water output through one or more heat exchangers, use a difference between the detected valve position and a fully open valve position to generate a performance score for the constraints generated by the constraint generator, and train the neural network model using the performance score.

In some embodiments, the neural network model is a convolutional neutral network model including an input layer having one or more input neurons, an output layer having one or more output neurons, and one or more sets of intermediate layers between the input layer and the output layer. Each set of the intermediate layers may include a convolutional layer, a rectified linear unit (ReLU) layer, and a pooling layer.

In some embodiments, the input neurons include values for at least one of an outdoor air temperature, a particular day of a week, a particular day of a year, or an occupancy status of the building.

In some embodiments, the output neurons include values for at least one of a minimum bound on the setpoints generated by the one or more optimization controllers at each time step of the optimization period or a maximum bound on the setpoints generated by the one or more optimization controllers at each time step of the optimization period.

Another implementation of the present disclosure is a method for operating equipment in a predictive building control system. The method includes generating one or more constraints by applying a set of inputs to a neural network model, performing an optimization to generate setpoints for the equipment at each time step of an optimization period subject to the one or more constraints, and operating the equipment to achieve the setpoints at each time step of the optimization period.

In some embodiments, the method includes classifying the constraints as satisfactory or unsatisfactory and training the neural network model based on whether the constraints are classified as satisfactory or unsatisfactory.

In some embodiments, the method includes generating a performance score for the constraints and training the neural network model using the performance score.

In some embodiments, the equipment include building equipment that operate to affect a zone temperature of a building zone. The setpoints may include zone temperature setpoints for the building zone at each time step of the optimization period. The constraints may include one or more temperature bounds on the zone temperature setpoints.

In some embodiments, the method includes detecting a manual adjustment to the setpoints generated by performing the optimization, using a magnitude of the manual adjustment generate a performance score for the constraints, and training the neural network model using the performance score.

In some embodiments, the equipment include central plant equipment that operate to affect a water temperature of a chilled water output or hot water output provided to the building. The setpoints may include water temperature setpoints for the chilled water output or the hot water output at each time step of the optimization period. The constraints may include one or more temperature bounds on the water temperature setpoints.

In some embodiments, the method includes detecting a valve position of a flow control valve that regulates a flow of the chilled water output or the hot water output through one or more heat exchangers, using a difference between the detected valve position and a fully open valve position to generate a performance score for the constraints, and training the neural network model using the performance score.

In some embodiments, the neural network model is a convolutional neutral network model including an input layer having one or more input neurons, an output layer having one or more output neurons, and one or more sets of intermediate layers between the input layer and the output layer. Each set of the intermediate layers may include a convolutional layer, a rectified linear unit (ReLU) layer, and a pooling layer.

In some embodiments, the input neurons include values for at least one of an outdoor air temperature, a particular day of a week, a particular day of a year, or an occupancy status of the building.

In some embodiments, the output neurons include values for at least one of a minimum bound on the setpoints generated by performing the optimization for each time step of the optimization period or a maximum bound on the setpoints generated by performing the optimization for each time step of the optimization period.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Building and HVAC System

Figure 1:
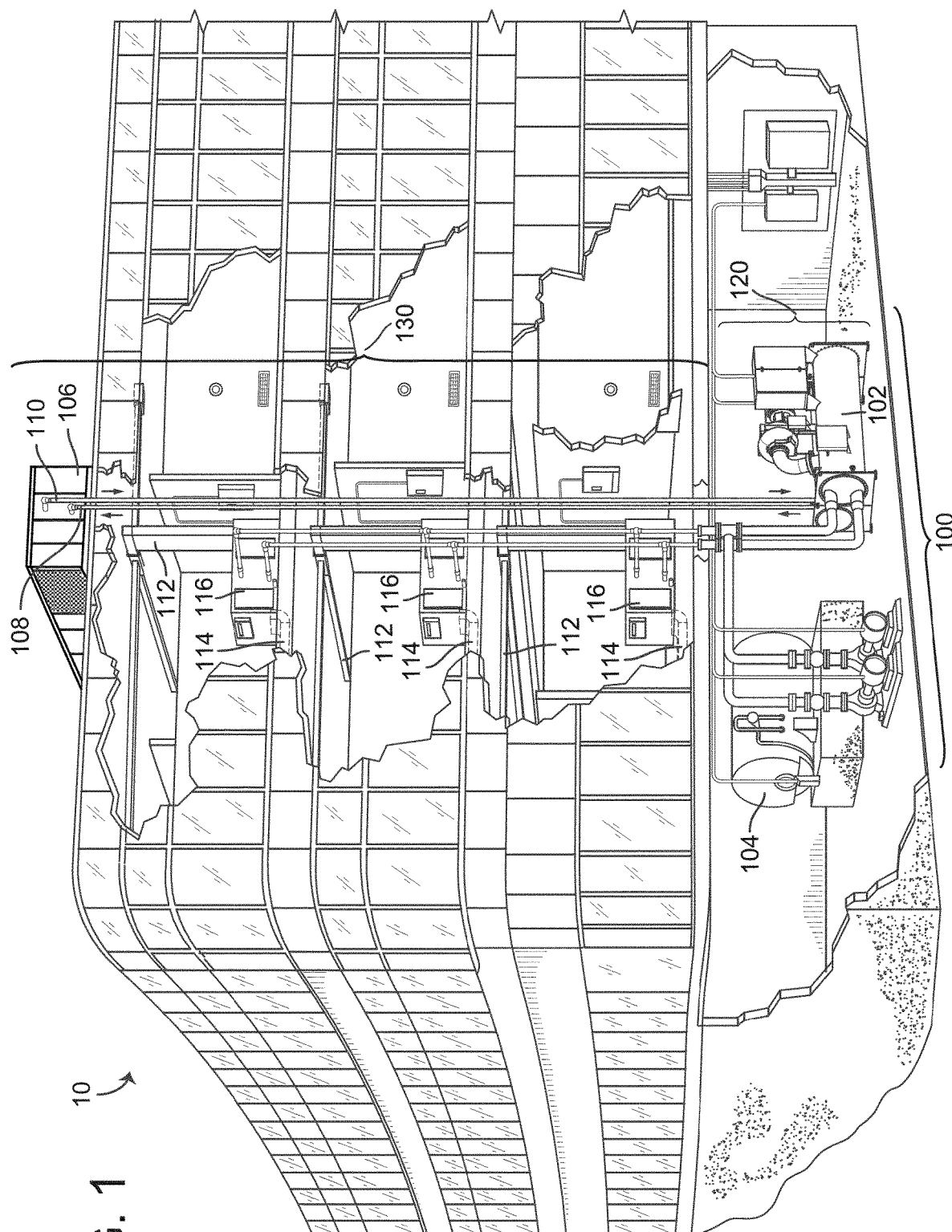
FIG. 1 is a drawing of a building equipped with a HVAC system, according to some embodiments.
Figure 2:
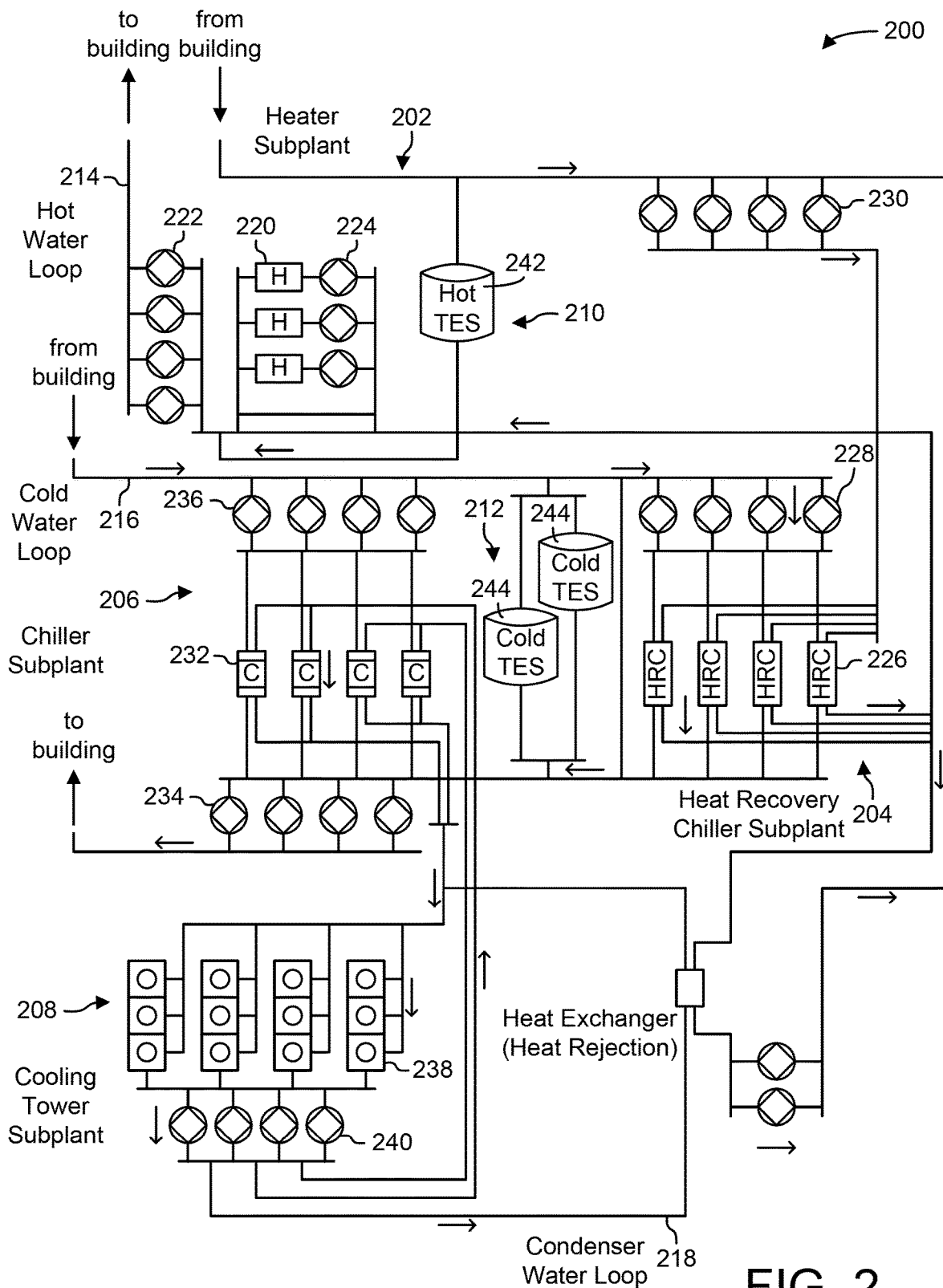
FIG. 2 is a schematic of a waterside system (e.g., a central plant) which can be used to provide heating or cooling to the building of FIG. 1, according to some embodiments.
Figure 3:
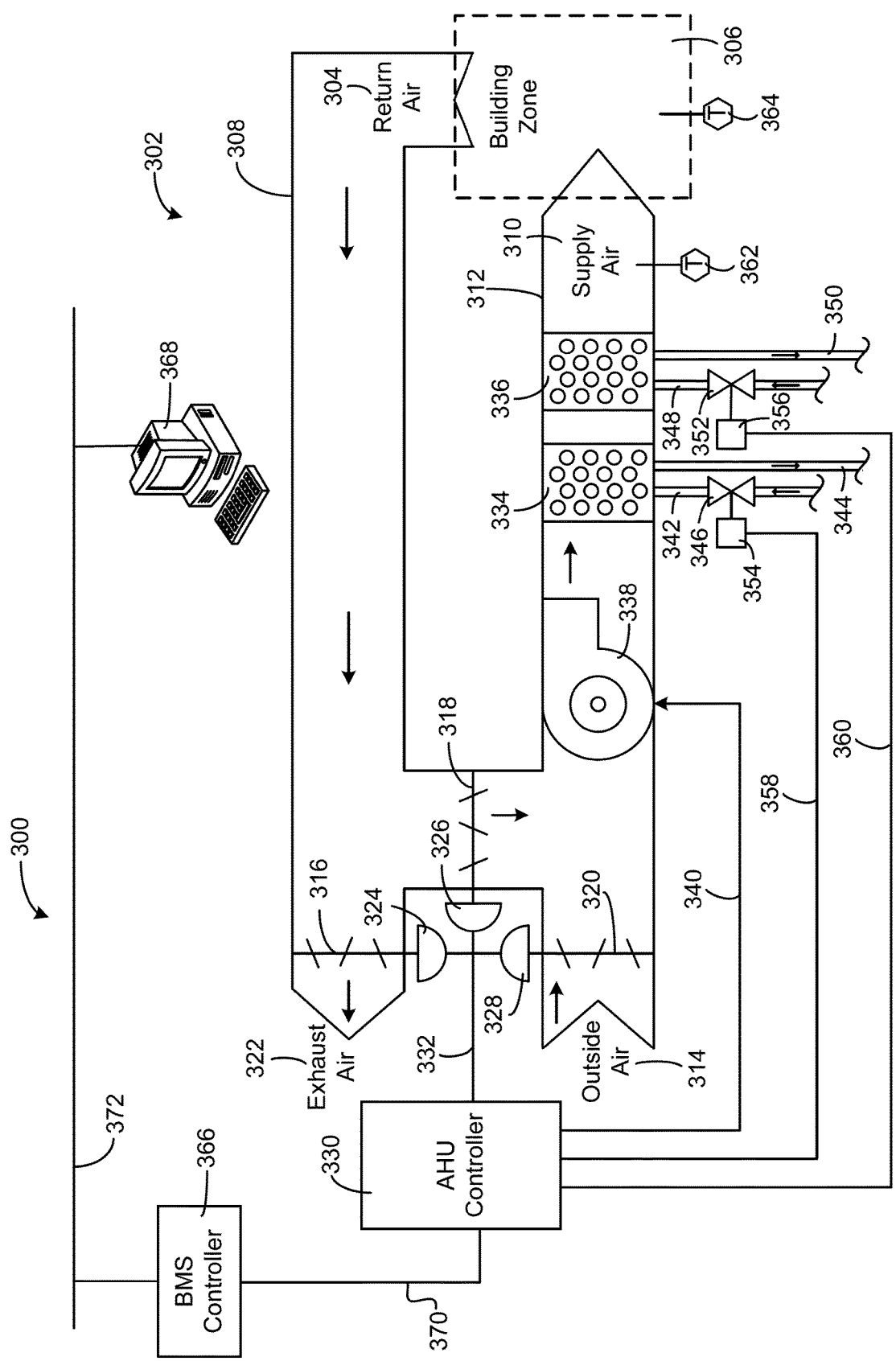
FIG. 3 is a block diagram of an airside system which can be used to provide heating or cooling to the building of FIG. 1, according to some embodiments.

Referring now to FIGS. 1-3, a building and HVAC system in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Energy System with Predictive Control

Figure 4:
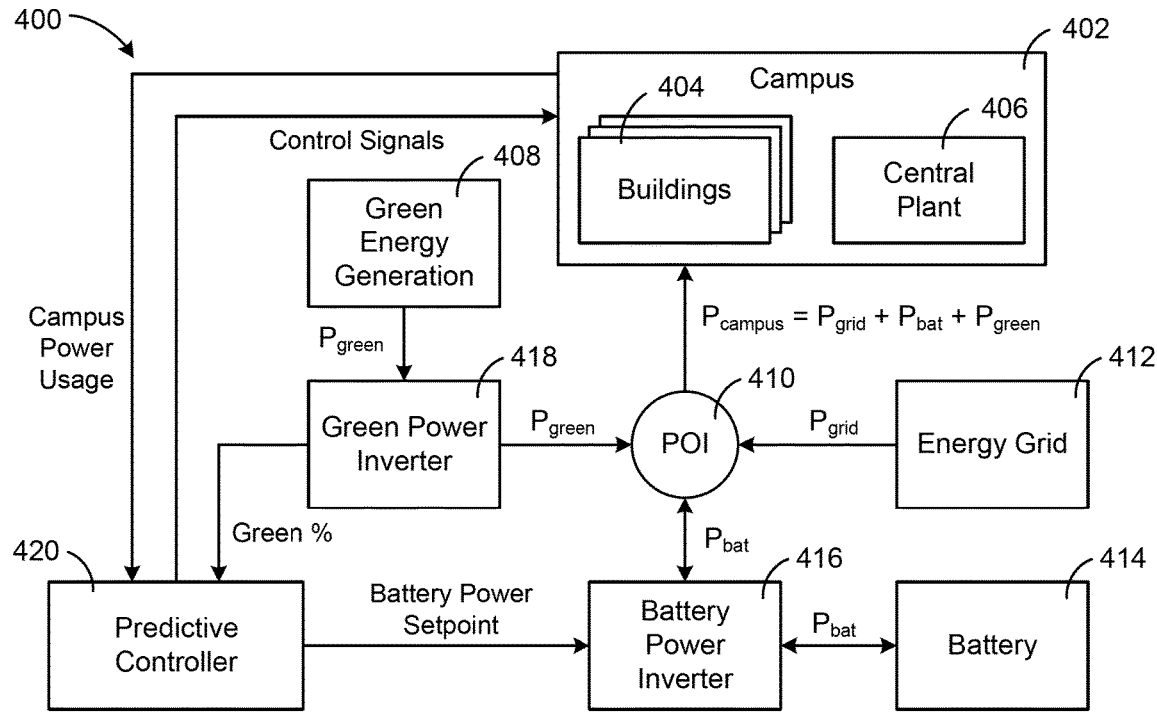
FIG. 4 is a block diagram of a building energy system with a predictive controller, according to some embodiments.
Figure 5:
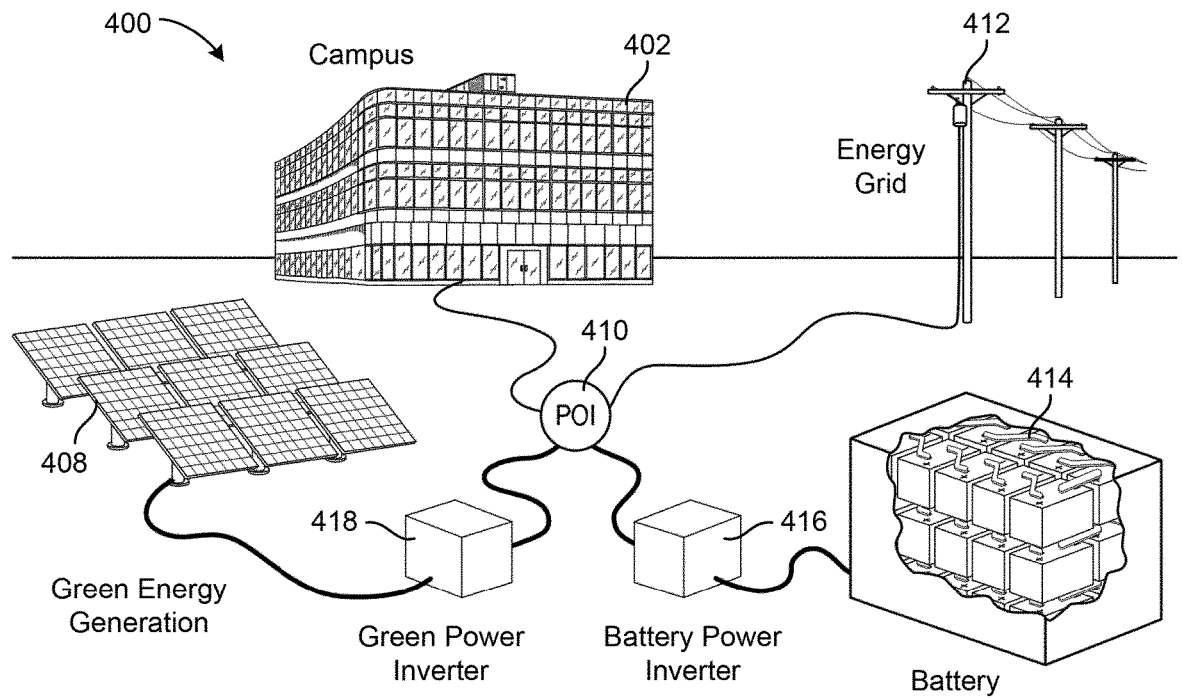
FIG. 5 is a drawing illustrating several components of the building energy system of FIG. 4, according to some embodiments.

Referring now to FIGS. 4-5, a building energy system 400 with predictive control is shown, according to some embodiments. Several of the components shown in system 400 may be part of HVAC system 100, waterside system 200, and/or airside system 300, as described with reference to FIGS. 1-3. For example, system 400 is shown to include a campus 402 including one or more buildings 404 and a central plant 406. Buildings 404 may include any of a variety of building equipment (e.g., HVAC equipment) configured to serve buildings 404. For example, buildings 404 may include one or more air handling units, rooftop units, chillers, boilers, variable refrigerant flow (VRF) systems, or other HVAC equipment operable to provide heating or cooling to buildings 404. Central plant 406 may include some or all of the components of waterside system 200 (e.g., a heater subplant 202, a heat recovery chiller subplant 204, a chiller subplant 206, a cooling tower subplant 208, a hot thermal energy storage (TES) subplant 210, and a cold thermal energy storage (TES) subplant 212, etc.). The equipment of central plant 406 (e.g., waterside equipment) can be used in combination with the equipment of buildings 404 (e.g., airside equipment) to provide heating or cooling to buildings 404.

Campus 402 can be powered by several different power sources including an energy grid 412, a battery 414, and green energy generation 408. Energy grid 412 may include an electric grid operated by an electric utility. The power provided by energy grid 412 is shown as $P_{grid}$. Green energy generation 408 can include any system or device that generates energy using a renewable energy source (i.e., green energy). For example, green energy generation 408 may include a photovoltaic field, a wind turbine array, a hydroelectric generator, a geothermal generator, or any other type of equipment or system that collects and/or generates green energy for use in system 400. The power provided by green energy generation 408 is shown as $P_{green}$. Battery 414 can be configured to store and discharge electric energy (i.e., electricity provided by energy grid 412 and/or green energy generation 408. The power provided by battery 414 is shown as $P_{bat}$, which can be positive if battery 414 is discharging or negative if battery 414 is charging.

Battery power inverter 416 may be configured to convert electric power between direct current (DC) and alternating current (AC). For example, battery 414 may be configured to store and output DC power, whereas energy grid 412 and campus 402 may be configured to consume and provide AC power. Battery power inverter 416 may be used to convert DC power from battery 414 into a sinusoidal AC output synchronized to the grid frequency of energy grid 412 and/or campus 402. Battery power inverter 416 may also be used to convert AC power from energy grid 412 into DC power that can be stored in battery 414. The power output of battery 414 is shown as $P_{bat}$. $P_{bat}$ may be positive if battery 414 is providing power to power inverter 416 (i.e., battery 414 is discharging) or negative if battery 414 is receiving power from power inverter 416 (i.e., battery 414 is charging).

Green power inverter 418 may also be configured to convert electric power between direct current (DC) and alternating current (AC). For example, green energy generation 408 may be configured to generate DC power, whereas campus 402 may be configured to consume AC power. Green power inverter 418 may be used to convert DC power from green energy generation 408 into a sinusoidal AC output synchronized to the grid frequency of energy grid 412 and/or campus 402.

In some instances, power inverters 416-418 receives a DC power output from battery 414 and/or green energy generation 408 and converts the DC power output to an AC power output that can be provided to campus 402. Power inverters 416-418 may synchronize the frequency of the AC power output with that of energy grid 412 (e.g., 50 Hz or 60 Hz) using a local oscillator and may limit the voltage of the AC power output to no higher than the grid voltage. In some embodiments, power inverters 416-418 are resonant inverters that include or use LC circuits to remove the harmonics from a simple square wave in order to achieve a sine wave matching the frequency of energy grid 412. In various embodiments, power inverters 416-418 may operate using high-frequency transformers, low-frequency transformers, or without transformers. Low-frequency transformers may convert the DC output from battery 414 or green energy generation 408 directly to the AC output provided to campus 402. High-frequency transformers may employ a multi-step process that involves converting the DC output to high-frequency AC, then back to DC, and then finally to the AC output provided to campus 402.

Point of interconnection (POI) 410 is the point at which campus 402, energy grid 412, and power inverters 416-418 are electrically connected. The power supplied to POI 410 from battery power inverter 416 is shown as $P_{bat}$. $P_{bat}$ may be positive if battery power inverter 416 is providing power to POI 410 (i.e., battery 414 is discharging) or negative if battery power inverter 416 is receiving power from POI 410 (i.e., battery 414 is charging). The power supplied to POI 410 from energy grid 412 is shown as $P_{grid}$, and the power supplied to POI 410 from green power inverter 418 is shown as $P_{green}$. $P_{bat}$, $P_{green}$, and $P_{grid}$ combine at POI 410 to form $P_{campus}$ (i.e., $P_{campus} = P_{grid} + P_{bat} + P_{green}$). $P_{campus}$ may be defined as the power provided to campus 402 from POI 410. In some instances, $P_{campus}$ is greater than $P_{grid}$. For example, when battery 414 is discharging, $P_{bat}$ may be positive which adds to the grid power $P_{grid}$ when $P_{bat}$ and $P_{grid}$ combine at POI 410. Similarly, when green energy generation 408 is providing power to POI 410, $P_{green}$ may be positive which adds to the grid power $P_{grid}$ when $P_{green}$ and $P_{grid}$ combine at POI 410. In other instances, $P_{campus}$ may be less than $P_{grid}$. For example, when battery 414 is charging, $P_{bat}$ may be negative which subtracts from the grid power $P_{grid}$ when $P_{bat}$ and $P_{grid}$ combine at POI 410.

Predictive controller 420 can be configured to control the equipment of campus 402 and battery power inverter 416 to optimize the economic cost of heating or cooling buildings 404. In some embodiments, predictive controller 420 generates and provides a battery power setpoint $P_{sp,bat}$ to battery power inverter 416. The battery power setpoint $P_{sp,bat}$ may include a positive or negative power value (e.g., kW) which causes battery power inverter 416 to charge battery 414 (when $P_{sp,bat}$ is negative) using power available at POI 410 or discharge battery 414 (when $P_{sp,bat}$ is positive) to provide power to POI 410 in order to achieve the battery power setpoint $P_{sp,bat}$.

In some embodiments, predictive controller 420 generates and provides control signals to campus 402. Predictive controller 420 may use a multi-stage optimization technique to generate the control signals. For example, predictive controller 420 may include an economic controller configured to determine the optimal amount of power to be consumed by campus 402 at each time step during the optimization period. The optimal amount of power to be consumed may minimize a cost function that accounts for the cost of energy consumed by the equipment of buildings 404 and/or central plant 406. The cost of energy may be based on time-varying energy prices defining the cost of purchasing electricity from energy grid 412 at various times. In some embodiments, predictive controller 420 determines an optimal amount of power to purchase from energy grid 412 (i.e., a grid power setpoint $P_{sp,grid}$) and an optimal amount of power to store or discharge from battery 414 (i.e., a battery power setpoint $P_{sp,bat}$) at each of the plurality of time steps. In some embodiments, predictive controller 420 determines an optimal power setpoint for each subsystem or device of campus 402 (e.g., each subplant of central plant 406, each device of building equipment, etc.). Predictive controller 420 may monitor the actual power usage of campus 402 and may utilize the actual power usage as a feedback signal when generating the optimal power setpoints.

Predictive controller 420 may include a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, predictive controller 420 uses equipment models for the equipment of buildings 404 and campus 402 to determine an amount of heating or cooling that can be generated by such equipment based on the optimal amount of power consumption. Predictive controller 420 can use a zone temperature model in combination with weather forecasts from a weather service to predict how the temperature of the building zone $T_{zone}$ will change based on the power setpoints and/or the temperature setpoints.

In some embodiments, predictive controller 420 uses the temperature setpoints to generate the control signals for the equipment of buildings 404 and campus 402. The control signals may include on/off commands, speed setpoints for fans, position setpoints for actuators and valves, or other operating commands for individual devices of campus 402. In other embodiments, the control signals may include the temperature setpoints (e.g., a zone temperature setpoint $T_{sp,zone}$, a supply air temperature setpoint $T_{sp,sa}$, etc.) generated by predictive controller 420. The temperature setpoints can be provided to campus 402 or local controllers for campus 402 which operate to achieve the temperature setpoints. For example, a local controller for an AHU fan within buildings 404 may receive a measurement of the supply air temperature $T_{sa}$ from a supply air temperature sensor and/or a measurement the zone temperature $T_{zone}$ from a zone temperature sensor. The local controller can use a feedback control process (e.g., PID, ESC, MPC, etc.) to adjust the speed of the AHU fan to drive the measured temperature(s) to the temperature setpoint(s). Similar feedback control processes can be used to control the positions of actuators and valves. The multi-stage optimization performed by predictive controller 420 is described in greater detail with reference to FIG. 6.

Predictive Controller

Figure 6:
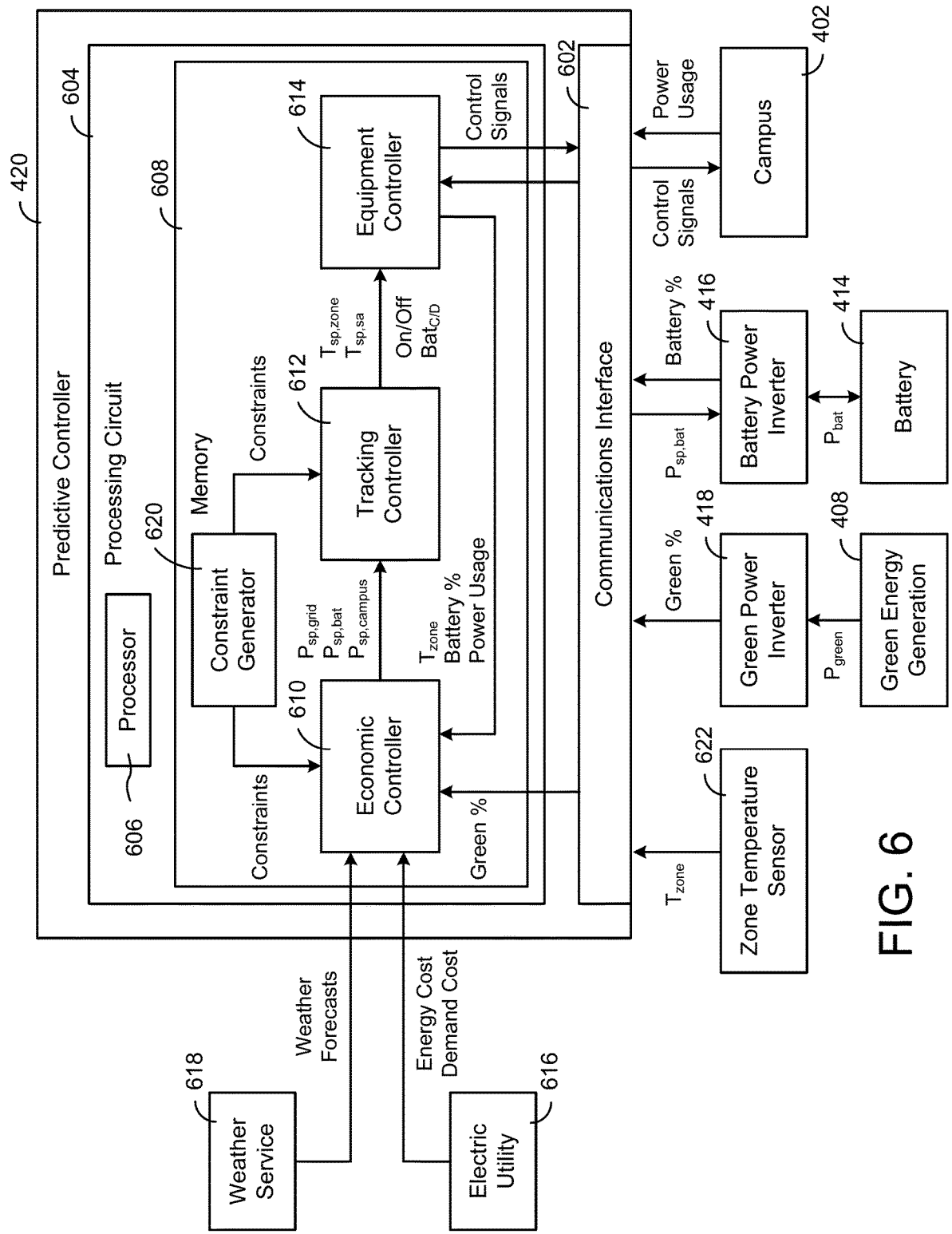
FIG. 6 is a block diagram illustrating the predictive controller of FIG. 4 in greater detail, according to some embodiments.

Referring now to FIG. 6, a block diagram illustrating predictive controller 420 in greater detail is shown, according to an exemplary embodiment. Predictive controller 420 is shown to include a communications interface 602 and a processing circuit 604. Communications interface 602 may facilitate communications between predictive controller 420 and external systems or devices. For example, communications interface 602 may receive measurements of the zone temperature $T_{zone}$ from a zone temperature sensor 622 and measurements of the power usage of campus 402. In some embodiments, communications interface 602 receives measurements of the state-of-charge (SOC) of battery 414, which can be provided as a percentage of the maximum battery capacity (i.e., battery %). Similarly, communications interface 602 may receive an indication of the amount of power being generated by green energy generation 408, which can be provided as a percentage of the maximum green power generation (i.e., green %). Communications interface 602 can receive weather forecasts from a weather service 618 and predicted energy costs and demand costs from an electric utility 616. In some embodiments, predictive controller 420 uses communications interface 602 to provide control signals campus 402 and battery power inverter 416.

Communications interface 602 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 602 can include an Ethernet card and port for sending and receiving data via an Ethernet-based communications link or network. In another example, communications interface 602 can include a WiFi transceiver for communicating via a wireless communications network or cellular or mobile phone communications transceivers.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 is configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein. When processor 606 executes instructions stored in memory 608 for completing the various activities described herein, processor 606 generally configures predictive controller 420 (and more particularly processing circuit 604) to complete such activities.

Still referring to FIG. 6, predictive controller 420 is shown to include an economic controller 610, a tracking controller 612, and an equipment controller 614. Controllers 610-614 can be configured to perform a multi-state optimization process to generate control signals for power battery power inverter 416 and campus 402. In brief overview, economic controller 610 can optimize a predictive cost function to determine an optimal amount of power to purchase from energy grid 412 (i.e., a grid power setpoint $P_{sp,grid}$), an optimal amount of power to store or discharge from battery 414 (i.e., a battery power setpoint $P_{sp,bat}$), and/or an optimal amount of power to be consumed by campus 402 (i.e., a campus power setpoint $P_{sp,campus}$) at each time step of an optimization period. Tracking controller 612 can use the optimal power setpoints $P_{sp,grid}$, $P_{sp,bat}$, and/or $P_{sp,campus}$ to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). Equipment controller 614 can use the optimal temperature setpoints $T_{sp,zone}$ or $T_{sp,sa}$ to generate control signals for campus 402 that drive the actual (e.g., measured) temperatures $T_{zone}$ and/or $T_{sa}$ to the setpoints (e.g., using a feedback control technique). Each of controllers 610-614 is described in detail below.

Economic Controller

Economic controller 610 can be configured to optimize a predictive cost function to determine an optimal amount of power to purchase from energy grid 412 (i.e., a grid power setpoint $P_{sp,grid}$), an optimal amount of power to store or discharge from battery 414 (i.e., a battery power setpoint $P_{sp,bat}$), and/or an optimal amount of power to be consumed by campus 402 (i.e., a campus power setpoint $P_{sp,campus}$) at each time step of an optimization period. An example of a predictive cost function which can be optimized by economic controller 610 is shown in the following equation:

$$\min(J) = \sum_{k=1}^{h} C_{ec}(k)P_{CPO}(k)\Delta t + \sum_{k=1}^{h} C_{ec}(k)P_{RTU}(k)\Delta t + \sum_{k=1}^{h} C_{ec}(k)P_{VRF}(k)\Delta t + \sum_{k=1}^{h} C_{ec}(k)P_{AHU}(k)\Delta t + C_{DC}\max_{k}(P_{grid}(k)) - \sum_{k=1}^{h} C_{ec}(k)P_{bat}(k)\Delta t$$

where $C_{ec}(k)$ is the cost per unit of electricity (e.g., \$/kWh) purchased from energy grid 412 during time step k, $P_{CPO}(k)$ is the total power consumption (e.g., kW) of central plant 406 time step k, $P_{RTU}(k)$ is the total power consumption of the RTUs of buildings 404 during time step k, $P_{VRF}(k)$ is the total power consumption of the VRF system used to serve buildings 404 during time step k, $P_{AHU}(k)$ is the total power consumption of the AHUs of buildings 404 during time step k, $C_{DC}$ is the demand charge rate (e.g., \$/kW), the max( ) term selects the maximum value of $P_{grid}(k)$ during any time step k of the optimization period, $P_{bat}(k)$ is the amount of power discharged from battery 414 during time step k, and $\Delta t$ is the duration of each time step k. Economic controller 610 can optimize the predictive cost function J over the duration of the optimization period (e.g., from time step k=1 to time step k=h) to predict the total cost of heating or cooling campus 402 over the duration of the optimization period.

The first term of the predictive cost function J represents the cost of electricity consumed by central plant 406 over the duration of the optimization period. The values of the parameter $C_{ec}(k)$ at each time step k can be defined by the energy cost information provided by electric utility 616. In some embodiments, the cost of electricity varies as a function of time, which results in different values of $C_{ec}(k)$ at different time steps k. The variable $P_{CPO}(k)$ is a decision variable which can be optimized by economic controller 610. In some embodiments, $P_{CPO}(k)$ is a component of $P_{campus}$ (e.g., $P_{campus}–P_{CPO}–P_{RTU}+P_{VRF}+P_{AHU}$). In some embodiments, $P_{CPO}(k)$ is a summation of the power consumptions of each subplant of central plant 406 (e.g., $P_{CPO}$ $P_{ChillerSubplant}+P_{HRCSubplant}+P_{HeaterSubplant}$).

In some embodiments, economic controller 610 uses one or more subplant curves for central plant 406 to relate the value of $P_{CPO}$ to the production of central plant 406 (e.g., hot water production, chilled water production, etc.). For example, if a chiller subplant 206 is used to generate a chilled fluid, a subplant curve for chiller subplant 206 can be used to model the performance of chiller subplant 206. In some embodiments, the subplant curve defines the relationship between input resources and output resources of chiller subplant 206. For example, the subplant curve for chiller subplant 206 may define the electricity consumption (e.g., kW) of chiller subplant 206 as a function of the amount of cooling provided by chiller subplant 206 (e.g., tons). Economic controller 610 can use the subplant curve for chiller subplant 206 to determine an amount of electricity consumption (kW) that corresponds to a given amount of cooling (tons). Similar subplant curves can be used to model the performance of other subplants of central plant 406. Several examples of subplant curves which can be used by economic controller 610 are described in greater detail in U.S. patent application Ser. No. 14/634,609 filed Feb. 27, 2015, the entire disclosure of which is incorporated by reference herein.

The second, third, and fourth terms of the predictive cost function J represent the cost of electricity consumed by the equipment of buildings 404. For example, the second term of the predictive cost function J represents the cost of electricity consumed by one or more AHUs of buildings 404. The third term of the predictive cost function J represents the cost of electricity consumed by a VRF system of buildings 404. The fourth term of the predictive cost function J represents the cost of electricity consumed by one or more RTUs of buildings 404. In some embodiments, economic controller 610 uses equipment performance curves to model the power consumptions $P_{RTU}$, $P_{VRF}$, and $P_{AHU}$ as a function of the amount of heating or cooling provided by the respective equipment of buildings 404. The equipment performance curves may be similar to the subplant curves in that they define a relationship between the heating or cooling load on a system or device and the power consumption of that system or device. The subplant curves and equipment performance curves can be used by economic controller 610 to impose constraints on the predictive cost function J.

The fifth term of the predictive cost function J represents the demand charge. Demand charge is an additional charge imposed by some utility providers based on the maximum power consumption during an applicable demand charge period. For example, the demand charge rate $C_DC$ may be specified in terms of dollars per unit of power (e.g., \$/kW) and may be multiplied by the peak power usage (e.g., kW) during a demand charge period to calculate the demand charge. In the predictive cost function J, the demand charge rate $C_{DC}$ may be defined by the demand cost information received from electric utility 616. The variable $P_{grid}(k)$ is a decision variable which can be optimized by economic controller 610 in order to reduce the peak power usage max($P_{grid}(k)$) that occurs during the demand charge period. Load shifting may allow economic controller 610 to smooth momentary spikes in the electric demand of campus 402 by storing energy in battery 414 when the power consumption of campus 402 is low. The stored energy can be discharged from battery 414 when the power consumption of campus 402 is high in order to reduce the peak power draw $P_{grid}$ from energy grid 412, thereby decreasing the demand charge incurred.

The final term of the predictive cost function J represents the cost savings resulting from the use of battery 414. Unlike the previous terms in the cost function J, the final term subtracts from the total cost. The values of the parameter $C_{ec}(k)$ at each time step k can be defined by the energy cost information provided by electric utility 616. In some embodiments, the cost of electricity varies as a function of time, which results in different values of $C_{ec}(k)$ at different time steps k. The variable $P_{bat}(k)$ is a decision variable which can be optimized by economic controller 610. A positive value of $P_{bat}(k)$ indicates that battery 414 is discharging, whereas a negative value of $P_{bat}(k)$ indicates that battery 414 is charging. The power discharged from battery 414 $P_{bat}(k)$ can be used to satisfy some or all of the total power consumption $P_{total}(k)$ of campus 402, which reduces the amount of power $P_{grid}(k)$ purchased from energy grid 412 (i.e., $P_{grid}(k)=P_{total}(k)-P_{bat}(k)-P_{green}(k)$). However, charging battery 414 results in a negative value of $P_{bat}(k)$ which adds to the total amount of power $P_{grid}(k)$ purchased from energy grid 412.

In some embodiments, the power $P_{green}$ provided by green energy generation 408 is not included in the predictive cost function J because generating green power does not incur a cost. However, the power $P_{green}$ generated by green energy generation 408 can be used to satisfy some or all of the total power consumption $P_{campus}(k)$ of campus 402, which reduces the amount of power $P_{grid}(k)$ purchased from energy grid 412 (i.e., $P_{grid}(k)=P_{campus}(k)-P_{bat}(k)-P_{green}(k)$). The amount of green power $P_{green}$ generated during any time step k can be predicted by economic controller 610. Several techniques for predicting the amount of green power generated by green energy generation 408 are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 610 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 610 can use battery 414 to perform load shifting by drawing electricity from energy grid 412 when energy prices are low and/or when the power consumed by campus 402 is low. The electricity can be stored in battery 414 and discharged later when energy prices are high and/or the power consumption of campus 402 is high. This enables economic controller 610 to reduce the cost of electricity consumed by campus 402 and can smooth momentary spikes in the electric demand of campus 402, thereby reducing the demand charge incurred.

Economic controller 610 can be configured to impose constraints on the optimization of the predictive cost function J. In some embodiments, economic controller 610 is configured to optimize the predictive cost function J subject to a set of equality constraints and inequality constraints. For example, the optimization performed by economic controller 610 can be described by the following equation:

$$\min J(x) \text{ subject to } Ax \leq b, Hx=g$$

where x is a matrix of the decision variables in predictive cost function J (e.g., $P_{CPO}$, $P_{RTU}$, $P_{VRF}$, $P_{AHU}$, $P_{grid}$, $P_{bat}$, etc.), A and b are a matrix and vector (respectively) which describe inequality constraints on the optimization problem, and H and g are a matrix and vector (respectively) which describe equality constraints on the optimization problem. The inequality constraints and the equality constraints may be generated by constraint generator 620, described in greater detail below.

In some embodiments, the matrix x of decision variables has the form:

$$x=[P_{CPO,1} \ldots {}_h P_{RTU,1} \ldots {}_h P_{VRF,1} \ldots {}_h P_{AHU,1} \ldots {}_h P_{grid,1} \ldots {}_h P_{bat,1} \ldots {}_h]^T$$

where $P_{CPO,1} \ldots {}_h$, $P_{RTU,1} \ldots {}_h$, $P_{VRF,1} \ldots {}_h$, $P_{AHU,1} \ldots {}_h$, $P_{grid,1} \ldots {}_h$, and $P_{bat,1} \ldots {}_h$ are h-dimensional vectors representing the power consumption of central plant 406, one or more RTUs of buildings 404, a VRF system of buildings 404, one or more AHUs of buildings 404, the power purchased from energy grid 412, and the power stored or discharged from battery 414 at each of the h time steps of the optimization period.

Economic controller 610 can optimize the predictive cost function J subject to the constraints to determine optimal values for the decision variables $P_{CPO}$, $P_{RTU}$, $P_{VRF}$, $P_{AHU}$, $P_{grid}$, and $P_{bat}$, where $P_{campus}=P_{bat}+P_{grid}+P_{green}$. In some embodiments, economic controller 610 uses the optimal values for $P_{campus}$, $P_{bat}$, and/or $P_{grid}$ to generate power setpoints for tracking controller 612. The power setpoints can include battery power setpoints $P_{sp,bat}$, grid power setpoints $P_{sp,grid}$, central plant power setpoints $P_{sp,CPO}$, AHU power setpoints $P_{sp,AHU}$, VRF power setpoints $P_{sp,VRF}$, RTU power setpoints $P_{sp,RTU}$, and/or power setpoints for each subplant of central plant 406 for each of the time steps k in the optimization period. Economic controller 610 can provide the power setpoints to tracking controller 612.

Tracking Controller

Tracking controller 612 can use the optimal power setpoints generated by economic controller 610 (e.g., $P_{sp,bat}$, $P_{sp,grid}$, $P_{sp,CPO}$, $P_{sp,AHU}$, $P_{sp,VRF}$, $P_{sp,RTU}$, $P_{sp,campus}$, etc.) to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$) In some embodiments, tracking controller 612 generates a zone temperature setpoint $T_{sp,zone}$ and/or a supply air temperature setpoint $T_{sp,sa}$ that are predicted to achieve the power setpoints for campus 402 (e.g., $P_{sp,CPO}$, $P_{sp,AHU}$, $P_{sp,VRF}$, $P_{sp,RTU}$, $P_{sp,campus}$). In other words, tracking controller 612 may generate a zone temperature setpoint $T_{sp,zone}$ and/or a supply air temperature setpoint $T_{sp,sa}$ that cause campus 402 to consume the optimal amount of power $P_{campus}$ determined by economic controller 610.

In some embodiments, tracking controller 612 relates the power consumption of campus 402 to the zone temperature $T_{zone}$ and the zone temperature setpoint $T_{sp,zone}$ using a power consumption model. For example, tracking controller 612 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_3(T_{zone}, T_{sp,zone})$$

where $v_{air}$ is the rate of airflow to the building zone (i.e., the control action). The zone regulatory controller model may be generated by constraint generator 620 and implemented as a constraint on the optimization problem.

In some embodiments, $v_{air}$ depends on the speed of a fan of an AHU or RTU used to provide airflow to buildings 404 and may be a function of $P_{AHU}$ or $P_{RTU}$. Tracking controller 612 can use an equipment model or manufacturer specifications for the AHU or RTU to translate $v_{air}$ into a corresponding power consumption value $P_{AHU}$ or $P_{RTU}$. Accordingly, tracking controller 612 can define the power consumption $P_{campus}$ of campus 402 as a function of the zone temperature $T_{zone}$ and the zone temperature setpoint $T_{sp,zone}$. An example of such a model is shown in the following equation:

$$P_{campus} = f_4(T_{zone}, T_{sp,zone})$$

The function $f_4$ can be identified from data. For example, tracking controller 612 can collect measurements of $P_{campus}$ and $T_{zone}$ and identify the corresponding value of $T_{sp,zone}$. Tracking controller 612 can perform a system identification process using the collected values of $P_{campus}$, $T_{zone}$, and $T_{sp,zone}$ as training data to determine the function $f_4$ that defines the relationship between such variables. The zone temperature model may be generated by constraint generator 620 and implemented as a constraint on the optimization problem.

Tracking controller 612 may use a similar model to determine the relationship between the total power consumption $P_{campus}$ of campus 402 and the supply air temperature setpoint $T_{sp,sa}$. For example, tracking controller 612 can define the power consumption $P_{campus}$ of campus 402 as a function of the zone temperature $T_{zone}$ and the supply air temperature setpoint $T_{sp,zone}$. An example of such a model is shown in the following equation:

$$P_{campus} = f_5(T_{zone}, T_{sp,sa})$$

The function $f_5$ can be identified from data. For example, tracking controller 612 can collect measurements of $P_{campus}$ and $T_{zone}$ and identify the corresponding value of $T_{sp,sa}$. Tracking controller 612 can perform a system identification process using the collected values of $P_{campus}$, $T_{zone}$, and $T_{sp,sa}$ as training data to determine the function $f_5$ that defines the relationship between such variables. The power consumption model may be generated by constraint generator 620 and implemented as a constraint on the optimization problem.

Tracking controller 612 can use the relationships between $P_{campus}$, $T_{sp,zone}$, and $T_{sp,sa}$ to determine values for $T_{sp,zone}$ and $T_{sp,sa}$. For example, tracking controller 612 can receive the value of $P_{campus}$ as an input from economic controller 610 (i.e., $P_{sp,campus}$) and can use the value of $P_{campus}$ to determine corresponding values of $T_{sp,zone}$ and $T_{sp,sa}$. Tracking controller 612 can provide the values of $T_{sp,zone}$ and $T_{sp,sa}$ as outputs to equipment controller 614.

In some embodiments, tracking controller 612 uses the battery power setpoint $P_{sp,bat}$ to determine the optimal rate $Bat_{C/D}$ at which to charge or discharge battery 414. For example, the battery power setpoint $P_{sp,bat}$ may define a power value (kW) which can be translated by tracking controller 612 into a control signal for battery power inverter 416 and/or equipment controller 614. In other embodiments, the battery power setpoint $P_{sp,bat}$ is provided directly to battery power inverter 416 and used by battery power inverter 416 to control the battery power $P_{bat}$.

Equipment Controller

Equipment controller 614 can use the optimal temperature setpoints $T_{sp,zone}$ or $T_{sp,sa}$ generated by tracking controller 612 to generate control signals for campus 402. The control signals generated by equipment controller 614 may drive the actual (e.g., measured) temperatures $T_{zone}$ and/or $T_{sa}$ to the setpoints. Equipment controller 614 can use any of a variety of control techniques to generate control signals for campus 402. For example, equipment controller 614 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for campus 402.

The control signals may include on/off commands, speed setpoints for fans or compressors, position setpoints for actuators and valves, or other operating commands for individual devices of building equipment and/or central plant equipment. In some embodiments, equipment controller 614 uses a feedback control technique (e.g., PID, ESC, MPC, etc.) to adjust the operation of central plant 406 to drive the measured temperatures $T_{zone}$ and/or $T_{sa}$ to the temperature setpoints $T_{sp,zone}$ and/or $T_{sp,sa}$. Similarly, equipment controller 614 can use a feedback control technique to control the equipment of buildings 404 (e.g., AHUs, RTUs, VRF equipment, etc.) to drive the measured temperatures $T_{zone}$ and/or $T_{sa}$ to the temperature setpoints $T_{sp,zone}$ and/or $T_{sp,sa}$. Equipment controller 614 can provide the control signals to the equipment of campus 402 to control the operation of such equipment, thereby causing the equipment of campus 402 to affect the zone temperature $T_{zone}$ and/or the supply air temperature $T_{sa}$.

In some embodiments, equipment controller 614 is configured to provide control signals to battery power inverter 416. The control signals provided to battery power inverter 416 can include a battery power setpoint $P_{sp,bat}$ and/or the optimal charge/discharge rate $Bat_{C/D}$. Equipment controller 614 can be configured to operate battery power inverter 416 to achieve the battery power setpoint $P_{sp,bat}$. For example, equipment controller 614 can cause battery power inverter 416 to charge battery 414 or discharge battery 414 in accordance with the battery power setpoint $P_{sp,bat}$.

Constraint Generator

Still referring to FIG. 6, predictive controller 420 is shown to include a constraint generator 620. Constraint generator 620 can be configured to generate and impose constraints on the optimization processes performed by economic controller 610 and tracking controller 612. For example, constraint generator 620 can impose inequality constraints and equality constraints on the optimization of the predictive cost function J performed by economic controller 610 to generate optimal power setpoints. Constraint generator 620 can also impose constraints on the optimization performed by tracking controller 612 to generate optimal temperature setpoints.

In some embodiments, the constraints generated by constraint generator 620 include constraints on the temperature $T_{zone}$ of buildings 404. Constraint generator 620 can be configured to generate a constraint that requires economic controller 610 to maintain the actual or predicted temperature $T_{zone}$ between an minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, constraint generator 620 can model the zone temperature $T_{zone}$ of buildings 404 as a function of the decision variables optimized by economic controller 610. In some embodiments, constraint generator 620 models $T_{zone}$ using a heat transfer model. For example, the dynamics of heating or cooling buildings 404 can be described by the energy balance:

$$C \frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature), $\dot{Q}_{HVAC}$ is the amount of heating applied to the building zone by the HVAC equipment of buildings 404, and $\dot{Q}_{other}$ is the external load, radiation, or other disturbance experienced by the building zone. In the previous equation, $\dot{Q}_{HVAC}$ represents heat transfer into the building zone (i.e., the heating load) and therefore has a positive sign. However, if cooling is applied to the building zone rather than heating, the sign on $\dot{Q}_{HVAC}$ can be switched to a negative sign such that $\dot{Q}_{HVAC}$ represents the amount of cooling applied to the building zone (i.e., the cooling load).

In some embodiments, the amount of heating or cooling $\dot{Q}_{HVAC}$ provided to buildings 404 can be defined as the heating or cooling load on the HVAC equipment of buildings 404 (e.g., RTUs, AHUs, VRF systems, etc.) and/or central plant 406. Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 610 include the following air and mass zone models:

$$C_z \frac{dT_{zone}}{dt} = H_{az}(T_a - T_{zone}) + H_{mz}(T_m - T_{zone}) + \dot{Q}_{HVAC} + \dot{Q}_{other}$$

$$C_m \frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 610 include the following air, shallow mass, and deep mass zone models:

$$C_z \frac{dT_{zone}}{dt} = H_{az}(T_a - T_{zone}) + H_{sz}(T_s - T_{zone}) + \dot{Q}_{HVAC} + \dot{Q}_{other}$$

$$C_s \frac{dT_s}{dt} = H_{sz}(T_{zone} - T_s) + H_{ds}(T_d - T_s)$$

$$C_d \frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, constraint generator 620 uses the weather forecasts from weather service 618 to determine appropriate values for the ambient air temperature $T_a$ and/or the external disturbance $\dot{Q}_{other}$ at each time step of the optimization period. Values of C and H can be specified as parameters of the building zone, received from tracking controller 612, received from a user, retrieved from memory 608, or otherwise provided as an input to constraint generator 620. Accordingly, the temperature of the building zone $T_{zone}$ can be defined as a function of the amount of heating or cooling $\dot{Q}_{HVAC}$ applied to the building zone using any of these heat transfer models. The manipulated variable $\dot{Q}_{HVAC}$ can be adjusted by economic controller 610 by adjusting the variables $P_{CPO}$, $P_{RTU}$, $P_{VRF}$, and/or $P_{AHU}$ in the predictive cost function J.

In some embodiments, constraint generator 620 uses a model that defines the amount of heating or cooling $\dot{Q}_{HVAC}$ applied to the building zone as a function of the power setpoints $P_{sp,grid}$ and $P_{sp,bat}$ provided by economic controller 610. For example, constraint generator 620 can add the power setpoints $P_{sp,grid}$ and $P_{sp,bat}$ to the green power generation $P_{green}$ to determine the total amount of power $P_{campus}$ that will be consumed by campus 402. In some embodiments, $P_{campus}$ is equivalent to the combined power consumption of buildings 404 and central plant 406 (e.g., $P_{campus} = P_{CPO} + P_{AHU} + P_{VRF} + P_{RTU}$). Constraint generator 620 can use $P_{campus}$ in combination with the subplant curves for central plant 406 and the equipment performance curves for the HVAC equipment of buildings 404 the total amount of heating or cooling $\dot{Q}_{HVAC}$ applied to the building zone.

In some embodiments, constraint generator 620 uses one or more models that define the amount of heating or cooling applied to the building zone (i.e., $\dot{Q}_{HVAC}$) as a function of the zone temperature $T_{zone}$ and the zone temperature setpoint $T_{sp,zone}$ as shown in the following equation:

$$\dot{Q}_{HVAC} = f(T_{zone}, T_{sp,zone})$$

The models used by constraint generator 620 can be imposed as optimization constraints to ensure that the amount of heating or cooling $\dot{Q}_{HVAC}$ provided is not reduced to a value that would cause the zone temperature $T_{zone}$ to deviate from an acceptable or comfortable temperature range.

In some embodiments, constraint generator 620 relates the amount of heating or cooling $\dot{Q}_{HVAC}$ to the zone temperature $T_{zone}$ and the zone temperature setpoint $T_{sp,zone}$ using multiple models. For example, constraint generator 620 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_1(T_{zone}, T_{sp,zone})$$

where $v_{air}$ is the rate of airflow to the building zone (i.e., the control action). In some embodiments, $v_{air}$ depends on the speed of an AHU fan or RTU fan and may be a function of $P_{AHU}$ and/or $P_{RTU}$. Constraint generator 620 can use an equipment model or manufacturer specifications for the AHU or RTU to define $v_{air}$ as a function of $P_{AH}$ or $P_{RTU}$. The function $f_1$ can be identified from data. For example, constraint generator 620 can collect measurements of $f_1$, $v_{air}$ and $T_{zone}$ and identify the corresponding value of $T_{sp,zone}$. Constraint generator 620 can perform a system identification process using the collected values of $v_{air}$, $T_{zone}$, and $T_{sp,zone}$ as training data to determine the function $f_1$ that defines the relationship between such variables.

Constraint generator 620 can use an energy balance model relating the control action $v_{air}$ to the amount of heating or cooling $\dot{Q}_{HVAC}$ provided to buildings 404 as shown in the following equation:

$$\dot{Q}_{HVAC} = f_2(v_{air})$$

where the function $f_2$ can be identified from training data. Constraint generator 620 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided to buildings 404 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c \left[ \varepsilon + \frac{1}{\tau_I} \int_0^r \varepsilon(t')dt' \right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_I$ is the zone PI controller integral time, and $\varepsilon$ is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 614, a nonlinear heating/cooling duty model can be used instead.

In addition to constraints on the zone temperature $T_{zone}$, constraint generator 620 can impose constraints on the state-of-charge (SOC) and charge/discharge rates of battery 414. In some embodiments, constraint generator 620 generates and imposes the following power constraints on the predictive cost function J:

$$P_{bat} \leq P_{rated}$$

$$-P_{bat} \leq P_{rated}$$

where $P_{bat}$ is the amount of power discharged from battery 414 and $P_{rated}$ is the rated battery power of battery 414 (e.g., the maximum rate at which battery 414 can be charged or discharged). These power constraints ensure that battery 414 is not charged or discharged at a rate that exceeds the maximum possible battery charge/discharge rate $P_{rated}$.

In some embodiments, constraint generator 620 generates and imposes one or more capacity constraints on the predictive cost function J The capacity constraints may be used to relate the battery power $P_{bat}$ charged or discharged during each time step to the capacity and SOC of battery 414. The capacity constraints may ensure that the capacity of battery 414 is maintained within acceptable lower and upper bounds at each time step of the optimization period. In some embodiments, constraint generator 620 generates the following capacity constraints:

$$C_a(k) - P_{bat}(k)\Delta t \leq C_{rated}$$

$$C_a(k) - P_{bat}(k)\Delta t \geq 0$$

where $C_a(k)$ is the available battery capacity (e.g., kWh) at the beginning of time step k, $P_{bat}(k)$ is the rate at which battery 414 is discharged during time step k (e.g., kW), $\Delta t$ is the duration of each time step, and $C_{rated}$ is the maximum rated capacity of battery 414 (e.g., kWh). The term $P_{bat}(k)\Delta t$ represents the change in battery capacity during time step k. These capacity constraints ensure that the capacity of battery 414 is maintained between zero and the maximum rated capacity $C_{rated}$.

In some embodiments, constraint generator 620 generates and imposes one or more power constraints. For example, economic controller 610 can be configured to generate a constraint which limits the power $P_{campus}$ provided to campus 402 between zero and the maximum power throughput $P_{campus,max}$ of POI 410, as shown in the following equation:

$$0 \leq P_{campus}(k) \leq P_{campus,max}$$

$$P_{campus}(k) = P_{sp,grid}(k) + P_{sp,bat}(k) + P_{green}(k)$$

where the total power $P_{campus}$ provided to campus 402 is the sum of the grid power setpoint $P_{sp,grid}$, the battery power setpoint $P_{sp,bat}$, and the green power generation $P_{green}$.

In some embodiments, constraint generator 620 generates and imposes one or more capacity constraints on the operation of central plant 406. For example, heating may be provided by heater subplant 202 and cooling may be provided by chiller subplant 206. The operation of heater subplant 202 and chiller subplant 206 may be defined by subplant curves for each of heater subplant 202 and chiller subplant 206. Each subplant curve may define the resource production of the subplant (e.g., tons refrigeration, kW heating, etc.) as a function of one or more resources consumed by the subplant (e.g., electricity, natural gas, water, etc.). Several examples of subplant curves which can be used by constraint generator 620 are described in greater detail in U.S. patent application Ser. No. 14/634,609 filed Feb. 27, 2015.

Neural Network Modeling

Figure 7:
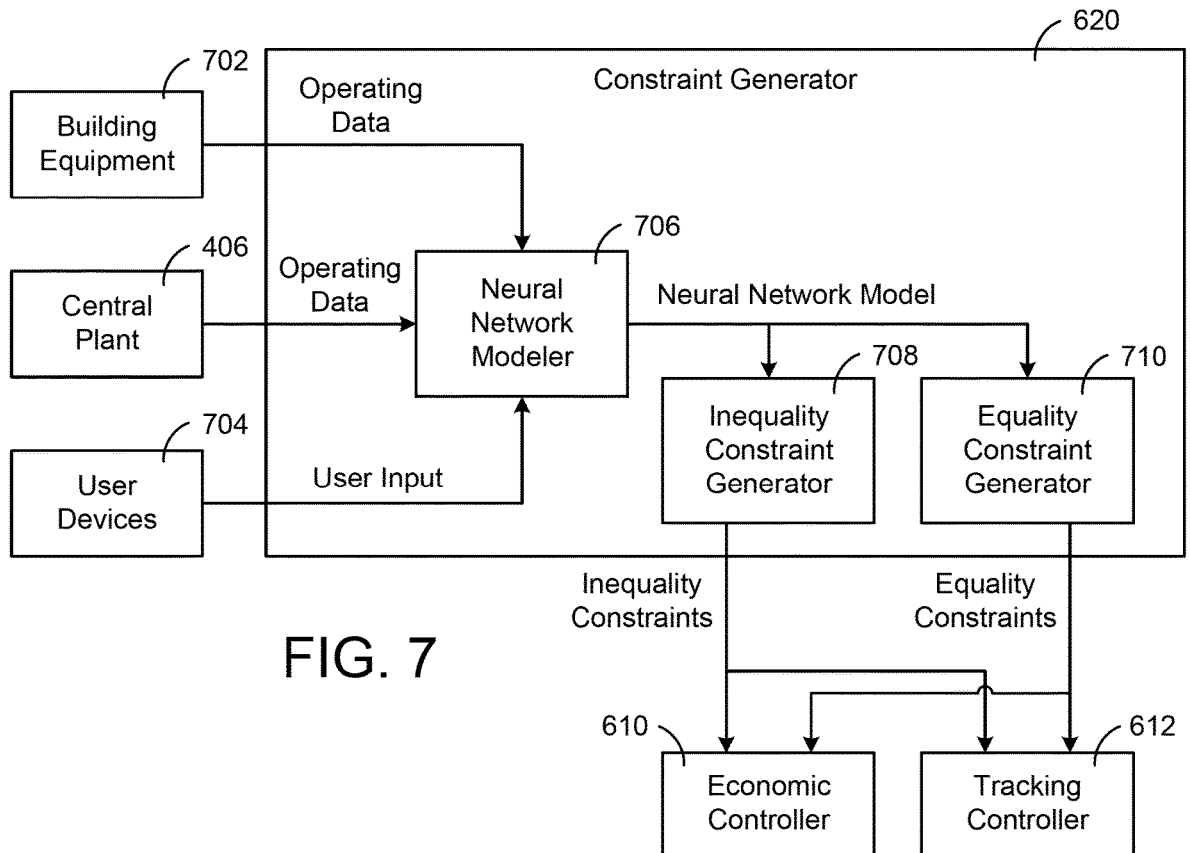
FIG. 7 is a block diagram illustrating a constraint generator of the predictive controller of FIG. 4 in greater detail, according to some embodiments.

Referring now to FIG. 7, a block diagram illustrating constraint generator 620 in greater detail is shown, according to an exemplary embodiment. Constraint generator 620 is shown to include a neural network modeler 706, an inequality constraint generator 708, and an equality constraint generator 710. In some embodiments, one or more components of constraint generator 620 are combined into a single component. However, the components are shown separated in FIG. 7 for ease of explanation.

Neural network modeler 706 may be configured to generate a neural network model that can be used to generate constraints for the optimization procedures performed by economic controller 610 and/or tracking controller 612. In some embodiments, the neutral network model is a convolutional neural network (CNN). A CNN is a type of feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. The CNN is also known as shift invariant or space invariant artificial neural network (SIANN), which is named based on its shared weights architecture and translation invariance characteristics.

Figure 8:
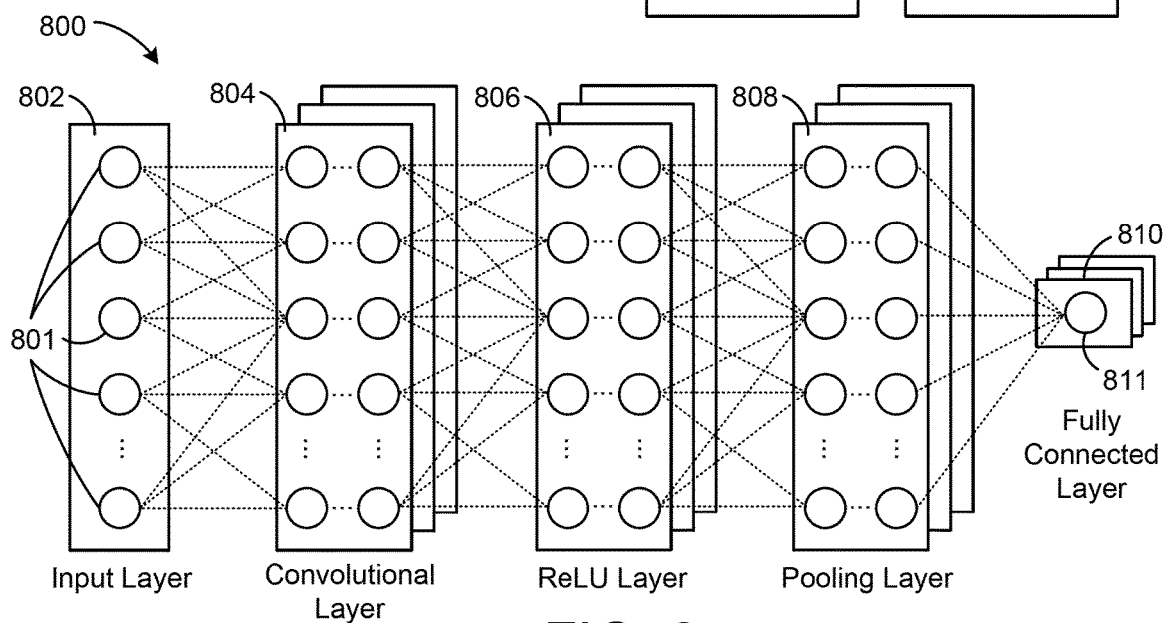
FIG. 8 is a drawing of a convolutional neural network (CNN) model which can be generated and used by the constraint generator of FIG. 7, according to some embodiments.

Referring now to FIG. 8, an example of a CNN 800 which can be generated and used by neural network modeler 706 is shown, according to an exemplary embodiment. CNN 800 is shown to include a sequence of layers including an input layer 802, a convolutional layer 804, a rectified linear unit (ReLU) layer 806, a pooling layer 808, and a fully connected layer 810 (i.e., an output layer). Each of layers 802-810 may transform one volume of activations to another through a differentiable function. Layers 802-810 can be stacked to form CNN 800. Unlike a regular (i.e., non-convolutional) neural network, layers 802-810 may have neurons arranged in 3 dimensions: width, height, depth. The depth of the neurons refers to the third dimension of an activation volume, not to the depth of CNN 800, which may refer to the total number of layers in CNN 800. Some neurons in one or more of layers of CNN 800 may only be connected to a small region of the layer before or after it, instead of all of the neurons in a fully-connected manner. In some embodiments, the final output layer of CNN 800 (i.e., fully-connected layer 810) is a single vector of class scores, arranged along the depth dimension.

In some embodiments, CNN 800 can be used to generate temperature bounds for a building zone (e.g., minimum and maximum allowable temperatures or temperature setpoints for the building zone). The temperature bounds can then be used by inequality constraint generator 708 and/or equality constraint generator 710 to generate and impose a temperature constraint for the predicted building zone temperature. In some embodiments, CNN 800 can be used to generate temperature bounds for a chilled water output produced by chillers of central plant 406 (e.g., minimum and maximum allowable temperatures of the chilled water output or chilled water setpoint). The temperature bounds can then be used by inequality constraint generator 708 and/or equality constraint generator 710 to generate and impose temperature constraints for the chilled water output or setpoint used by chillers of central plant 406. In some embodiments, CNN 800 can be used to generate temperature bounds for a hot water output produced by boilers or other hot water generators of central plant 406 (e.g., minimum and maximum allowable temperatures of the hot water output or hot water setpoint). The temperature bounds can then be used by inequality constraint generator 708 and/or equality constraint generator 710 to generate and impose temperature constraints for the hot water output or setpoint used by the boilers or other hot water generators of central plant 406. Although these specific examples are discussed in detail, it should be understood that CNN 800 can be used to generate values any other constraint on the optimization procedures performed by economic controller 610 and/or tracking controller 612.

Input layer 802 is shown to include a set of input neurons 801. Each of input neurons 801 may correspond to a variable that can be monitored by neural network modeler 706 and used as an input to CNN 800. For example, input neurons 801 may correspond to variables such as outdoor air temperature (OAT) (e.g., a temperature value in degrees F. or degrees C.), the day of the week (e.g., 1=Sunday, 2=Monday, . . . , 7=Saturday), the day of the year (e.g., 0=January 1st, 1=January 2nd, . . . , 365=December 31st), a binary occupancy value for a building zone (e.g., 0=unoccupied, 1=occupied), a percentage of occupancy for the building zone (e.g., 0% if the building zone is unoccupied, 30% of the building zone is at 30% of maximum occupancy, 100% of the building zone is fully occupied, etc.), a measured temperature of the building zone (e.g., a temperature value in degrees F. or degrees C.), operating data from building equipment 702 or central plant 406 (e.g., an operating capacity of an AHU that provides airflow to the building zone, a valve position of a flow control valve that regulates flow of the heated or chilled fluid through a heat exchanger, etc.), or any other variable that may be relevant to generating appropriate temperature bounds.

Convolutional layer 804 may receive input from input layer 802 and provide output to ReLU layer 806. In some embodiments, convolutional layer 804 is the core building block of CNN 800. The parameters of convolutional layer 804 may include a set of learnable filters (or kernels), which have a small receptive field, but extend through the full depth of the input volume. During the forward pass, each filter may be convolved across the width and height of the input volume, computing the dot product between the entries of the filter and entries within input layer 802 and producing a 2-dimensional activation map of that filter. As a result, CNN 800 learns filters that activate when it detects some specific type of feature indicated by input layer 802. Stacking the activation maps for all filters along the depth dimension forms the full output volume of convolutional layer 804. Every entry in the output volume can thus also be interpreted as an output of a neuron that looks at a small region in input layer 802 and shares parameters with neurons in the same activation map. In some embodiments, CNN 800 includes more than one convolutional layer 804.

ReLU layer 806 may receive input from convolutional layer 804 and may provide output to fully connected layer 810. ReLU is the abbreviation of Rectified Linear Units. ReLu layer 806 may apply a non-saturating activation function such as $f(x)=\max(0, x)$ to the input from convolutional layer 804. ReLU layer 806 may function to increase the nonlinear properties of the decision function and of the overall network without affecting the receptive fields of convolutional layer 804. Other functions can also used in ReLU layer 806 to increase nonlinearity including, for example, the saturating hyperbolic tangent $f(x)=\tan h(x)$ or $f(x)=|\tan h(x)|$ and the sigmoid function $f(x)=(1+e^{-x})^{-1}$. The inclusion of ReLU layer 806 may cause CNN 800 to train several times faster without a significant penalty to generalization accuracy.

Pooling layer 808 may receive input from ReLU layer 806 and provide output to fully connected layer 810. Pooling layer 808 can be configured to perform a pooling operation on the input received from ReLU layer 806. Pooling is a form of non-linear down-sampling. Pooling layer 808 can use any of a variety of non-linear functions to implement pooling, including for example max pooling. Pooling layer 808 can be configured to partition the input from ReLU layer 806 into a set of non-overlapping sub-regions and, for each such sub-region, output the maximum. The intuition is that the exact location of a feature is less important than its rough location relative to other features. Pooling layer 808 serves to progressively reduce the spatial size of the representation, to reduce the number of parameters and amount of computation in the network, and hence to also control overfitting. Accordingly, pooling layer 808 provides a form of translation invariance.

In some embodiments, pooling layer 808 operates independently on every depth slice of the input and resizes it spatially. For example, pooling layer 808 may include filters of size 2×2 applied with a stride of 2 down-samples at every depth slice in the input by 2 along both width and height, discarding 75% of the activations. In this case, every max operation is over 4 numbers. The depth dimension remains unchanged. In addition to max pooling, pooling layer 808 can also perform other functions, such as average pooling or L2-norm pooling.

In some embodiments, CNN 800 includes multiple instances of convolutional layer 804, ReLU layer 806, and pooling layer 808. For example, pooling layer 808 may be followed by another instance of convolutional layer 804, which may be followed by another instance of ReLU layer 806, which may be followed by another instance of pooling layer 808. Although only one set of layers 804-808 is shown in FIG. 8, it is understood that CNN 800 may include one or more sets of layers 804-808 between input layer 802 and fully-connected layer 810. Accordingly, CNN 800 may be an "M-layer" CNN, where M is the total number of layers between input layer 802 and fully connected layer 810.

Fully connected layer 810 is the final layer in CNN 800 and may be referred to as an output layer. Fully connected layer 810 may follow one or more sets of layers 804-808 and may be perform the high-level reasoning in CNN 800. In some embodiments, output neurons 811 in fully connected layer 810 may have full connections to all activations in the previous layer (i.e., an instance of pooling layer 808). The activations of output neurons 811 can hence be computed with a matrix multiplication followed by a bias offset. In some embodiments, output neurons 811 within fully connected layer 810 are arranged as a single vector of class scores along the depth dimension of CNN 800.

In some embodiments, each of output neurons 811 represents a threshold value (e.g., a boundary value, a boundary range around a setpoint, etc.) which can be used to formulate a constraint on the optimization procedures performed by economic controller 610 and/or tracking controller 612. For example, one or more of output neurons 811 may represent temperature bounds for a building zone (e.g., minimum and maximum allowable temperatures or temperature setpoints for the building zone). The temperature bounds can be used by inequality constraint generator 708 and/or equality constraint generator 710 to generate and impose a temperature constraint for the predicted building zone temperature.

In some embodiments, one or more of output neurons 811 represent temperature bounds for a chilled water output produced by chillers of central plant 406 (e.g., minimum and maximum allowable temperatures of the chilled water output or chilled water setpoint). The temperature bounds can be used by inequality constraint generator 708 and/or equality constraint generator 710 to generate and impose temperature constraints for the chilled water output or setpoint used by chillers of central plant 406. Similarly, one or more of output neurons 8110 may represent temperature bounds for a hot water output produced by boilers or other hot water generators of central plant 406 (e.g., minimum and maximum allowable temperatures of the hot water output or hot water setpoint). The temperature bounds can be used by inequality constraint generator 708 and/or equality constraint generator 710 to generate and impose temperature constraints for the hot water output or setpoint used by the boilers or other hot water generators of central plant 406.

Referring again to FIG. 7, neural network modeler 706 can use various inputs to evaluate and score the constraints generated by CNN 800. Such inputs may include operating data from building equipment 702, operating data from central plant 406, and/or user input from user devices 704. In some embodiments, the user input from user devices 704 includes manual overrides, setpoint adjustments, manual values for parameters, or other input that describes user actions. Neural network modeler 706 can use the user input from user devices 704 to determine whether the operating state of building equipment 702 and/or central plant 406 at a given time was satisfactory or whether adjustment was required. Neural network modeler 706 can use these and other types of user input to identify how people react to the constraints generated by constraint generator 620 to determine which constraint values are desired.

For example, the output of CNN 800 may include temperature bounds for a building zone. The temperature bounds may specify that the temperature of the building zone is allowed vary within an allowable temperature range between a minimum zone temperature and a maximum zone temperature. Accordingly, predictive controller 420 may operate building equipment 702 and/or central plant 406 to ensure that the temperature of the building zone is maintained between the minimum zone temperature and the maximum zone temperature. To score the temperature bounds generated by constraint generator 620, neural network modeler 706 may inspect user input indicating a manual adjustment to the temperature setpoint for a building zone. In response to the manual setpoint adjustment, neural network modeler 706 may determine that the previous temperature setpoint (i.e., the temperature setpoint generated by predictive controller 420, prior to adjustment) was out of the desirable range.

In some embodiments, neural network modeler 706 uses the magnitude of the manual setpoint adjustment as an indication of the user's dissatisfaction with the temperature setpoint generated by predictive controller 420 based on the temperature constraints generated by constraint generator 620. For example, a manual setpoint adjustment having a large magnitude may indicate a large dissatisfaction with the temperature constraints generated by constraint generator 620 and therefore may result in a low performance score. A manual setpoint adjustment having a small magnitude may indicate a slight dissatisfaction with the temperature constraints generated by constraint generator 620 and therefore may result in a relatively higher performance score. The absence of a manual setpoint adjustment may indicate user satisfaction with the temperature constraints generated by constraint generator 620 and therefore may result in a high performance score.

As another example, the output of CNN 800 may include temperature bounds for the chilled water output by chillers of central plant 406. The temperature bounds may specify that the chilled water temperature (or temperature setpoint)

is allowed to vary within an allowable temperature range between a minimum chilled water temperature and a maximum chilled water temperature. Accordingly, predictive controller 420 may operate the chillers of central plant 406 to ensure that the temperature of chilled water output (or temperature setpoint) is maintained between the minimum chilled water temperature and the maximum chilled water temperature.

To score the temperature bounds generated by constraint generator 620, neural network modeler 706 may use operating data from building equipment 702 to determine whether any heat exchangers are making full use of the chilled water. For example, the operating data from building equipment 702 may indicate the valve positions of flow control valves that regulate the flow of the chilled water through cooling coils or other heat exchangers. If the operating data indicates that a flow control valve is fully open, then that valve is making full use of the chilled water. Conversely, if the operating data indicates that none of the flow control valves are fully open, then none of the flow control valves are making full use of the chilled water (i.e., none of the heat exchangers require the full cooling capacity provided by the chilled water).

In some embodiments, neural network modeler 706 uses the positions of the flow control valves as an indication of whether the chilled water temperature constraints are good or bad. For example, if none of the valves are fully open, neural network modeler 706 may determine that the chilled water temperature setpoint can be increased to reduce the energy consumption of the chillers without impacting the cooling performance of building equipment 702. The chilled water temperature can be increased until at least one of the valves is fully open to make most efficient use of the chilled water. Accordingly, neural network modeler 706 can identify the valve that is closest to fully open and can determine the difference in position between the position of that valve (e.g., 60% open) and a fully open position (e.g., 100% open). A large difference in valve position may result in a low performance score, whereas a small difference in valve position may result in a high performance score. The same scoring technique can be applied to the hot water temperature bounds generated by constraint generator 620.

Inequality constraint generator 708 and equality constraint generator 710 can use the neural network model created by neural network modeler 706 to generate inequality constraints and equality constraints. Constraint generator 620 can provide the inequality constraints and equality constraints to economic controller 610 to constrain the optimization of the predictive cost function J performed by economic controller 610 to generate optimal power setpoints. Constraint generator 620 can also provide the inequality constraints and the equality constraints to tracking controller 612 to constrain the optimization performed by tracking controller 612 to generate optimal temperature setpoints.

In some embodiments, constraint generators 708-710 use the operating data from building equipment 702 to generate various functions that define the operational domain of building equipment 702. Similarly, the operating data from central plant 406 can be used to identify relationships between the inputs and outputs of each subplant of central plant 406 and/or each device of central plant 406. Constraint generators 708-710 can use the operating data from central plant 406 to generate various functions that define the operational domains of central plant 406.

In some embodiments, constraint generators 708-710 use the operating data from building equipment 702 and central plant 406 to determine limits on the operation of building equipment 702 and central plant 406. For example, a chiller may have a maximum cooling capacity which serves as a limit on the amount of cooling that the chiller can produce. Constraint generators 708-710 can use the operating data to determine the point at which the cooling provided by the chiller reaches its maximum value (e.g., by identifying the point at which the cooling output ceases to be a function of the load setpoint) in order to determine the maximum operating limit for the chiller. Similar processes can be used to identify the maximum operating points for other devices of building equipment 702 and central plant 406. These operating limits can be used by inequality constraint generator 708 to generate inequality constraints that limit the operation of building equipment 702 and central plant 406 within the applicable limits.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building control system comprising:
one or more processors; and
one or more non-transitory computer-readable media storing instructions that, when executed by the one or more processors, cause the one or more processors to perform operations comprising:
using an artificial intelligence model to adjust a threshold value of a constraint based on user input provided via one or more user devices during a first time period, the user input indicating user satisfaction with an environmental condition of a building space during the first time period; and
using the threshold value of the constraint to operate equipment that affect the environmental condition of the building space during a second time period subsequent to the first time period.

2. The control system of claim 1, wherein using the threshold value of the constraint to operate the equipment comprises performing a constrained optimization subject to the constraint to generate control decisions for the equipment over the second time period.

3. The control system of claim 1, wherein using the threshold value of the constraint to operate the equipment comprises:
generating setpoints for the equipment predicted to maintain the environmental condition of the building space within a comfort range defined at least partially by the threshold value of the constraint during the second time period; and
using the setpoints to operate the equipment during the second time period.

4. The control system of claim 1, wherein:
adjusting the threshold value of the constraint based on the user input comprises adjusting a comfort range for the environmental condition of the building space; and
using the threshold value of the constraint to operate the equipment comprises operating the equipment to maintain the environmental condition of the building space within the comfort range.

5. The control system of claim 1, wherein the artificial intelligence model comprises an artificial neural network model.

6. The control system of claim 1, wherein the user input indicating the user satisfaction with the environmental condition of the building space comprises one or more user adjustments to a setpoint for the environmental condition of the building space.

7. The control system of claim 1, wherein the user input indicating the user satisfaction with the environmental condition of the building space comprises an indication of whether one or more users are comfortable in the building space during the first time period.

8. The control system of claim 1, wherein:
the equipment comprise heating, ventilation, or air conditioning (HVAC) equipment that operate to affect a temperature of the building space; and
the threshold value of the constraint defines a temperature bound for the temperature of the building space;
using the threshold value of the constraint to operate the equipment comprises operating the HVAC equipment to maintain the temperature of the building space within a temperature range defined at least partially by the temperature bound.

9. The control system of claim 1, wherein:
the equipment comprise central plant equipment that operate to affect a water temperature of a chilled water output or hot water output used to provide heating or cooling to the building space;
the threshold value of the constraint defines a temperature bound for the water temperature; and
using the threshold value of the constraint to operate the equipment comprises operating the central plant equipment to maintain the water temperature of within a temperature range defined at least partially by the temperature bound.

10. The control system of claim 1, the operations further comprising
classifying the constraint as satisfactory or unsatisfactory based on the user input indicating the user satisfaction with the environmental condition of the building space during the first time period; and
adjusting the threshold value of the constraint in response to the constraint being classified as unsatisfactory during the first time period.

11. A method for controlling equipment that operate to affect an environmental condition of a building space, the method comprising:
using an artificial intelligence model to adjust a threshold value of a constraint based on user input provided via one or more user devices during a first time period, the user input indicating user satisfaction with the environmental condition of the building space during the first time period; and
using the threshold value of the constraint to operate the equipment that affect the environmental condition of the building space during a second time period subsequent to the first time period.

12. The method of claim 11, wherein using the threshold value of the constraint to operate the equipment comprises performing a constrained optimization subject to the constraint to generate control decisions for the equipment over the second time period.

13. The method of claim 11, wherein using the threshold value of the constraint to operate the equipment comprises:
generating setpoints for the equipment predicted to maintain the environmental condition of the building space within a comfort range defined at least partially by the threshold value of the constraint during the second time period; and
using the setpoints to operate the equipment during the second time period.

14. The method of claim 11, wherein:
adjusting the threshold value of the constraint based on the user input comprises adjusting a comfort range for the environmental condition of the building space; and
using the threshold value of the constraint to operate the equipment comprises operating the equipment to maintain the environmental condition of the building space within the comfort range.

15. The method of claim 11, wherein the artificial intelligence model comprises an artificial neural network model.

16. The method of claim 11, wherein the user input indicating the user satisfaction with the environmental condition of the building space comprises one or more user adjustments to a setpoint for the environmental condition of the building space.

17. The method of claim 11, wherein the user input indicating the user satisfaction with the environmental condition of the building space comprises an indication of whether one or more users are comfortable in the building space during the first time period.

18. The method of claim 11, wherein:
the equipment comprise heating, ventilation, or air conditioning (HVAC) equipment that operate to affect a temperature of the building space; and
the threshold value of the constraint defines a temperature bound for the temperature of the building space;
using the threshold value of the constraint to operate the equipment comprises operating the HVAC equipment to maintain the temperature of the building space within a temperature range defined at least partially by the temperature bound.

19. The method of claim 11, wherein:
the equipment comprise central plant equipment that operate to affect a water temperature of a chilled water output or hot water output used to provide heating or cooling to the building space;
the threshold value of the constraint defines a temperature bound for the water temperature; and
using the threshold value of the constraint to operate the equipment comprises operating the central plant equipment to maintain the water temperature of within a temperature range defined at least partially by the temperature bound.

20. The method of claim 11, comprising
classifying the constraint as satisfactory or unsatisfactory based on the user input indicating the user satisfaction with the environmental condition of the building space during the first time period; and
adjusting the threshold value of the constraint in response to the constraint being classified as unsatisfactory during the first time period.

* * * * *